United States Patent
Chai et al.

(10) Patent No.: US 11,082,965 B2
(45) Date of Patent: Aug. 3, 2021

(54) RESOURCE ALLOCATION METHOD AND RELEVANT DEVICE

(71) Applicant: HUAWEI TECHNOLOGIES CO., LTD., Shenzhen (CN)

(72) Inventors: Li Chai, Shenzhen (CN); Hong Wang, Beijing (CN); Jian Zhang, Beijing (CN); Wei Quan, Beijing (CN); Zhenzhen Cao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 285 days.

(21) Appl. No.: 16/188,406

(22) Filed: Nov. 13, 2018

(65) Prior Publication Data

US 2019/0215806 A1 Jul. 11, 2019

Related U.S. Application Data

(63) Continuation of application No. PCT/CN2016/082137, filed on May 13, 2016.

(51) Int. Cl.
*H04W 72/04* (2009.01)
*H04W 92/20* (2009.01)
(Continued)

(52) U.S. Cl.
CPC .......... *H04W 72/042* (2013.01); *H04W 4/70* (2018.02); *H04W 24/10* (2013.01); *H04W 48/12* (2013.01);
(Continued)

(58) Field of Classification Search
CPC ..... H04W 88/06; H04W 92/20; H04W 92/22; H04W 72/0426; H04W 72/042;
(Continued)

(56) References Cited

U.S. PATENT DOCUMENTS 10,034,221 B2 * 7/2018 Cao ..................... H04W 76/10
2011/0136494 A1 * 6/2011 Kim .................. H04W 72/0426
455/450

(Continued)

FOREIGN PATENT DOCUMENTS

CN 1882154 A 12/2006
CN 101605382 A 12/2009
(Continued)

OTHER PUBLICATIONS

Author Unknown, Interference coordination for 5G new radio interface, Doc. No. R1-162185 Apr. 15, 2016 (Year: 2016).*

*Primary Examiner* — Christopher M Crutchfield

(57) ABSTRACT

The method may include: after receiving, through a first interface or a second interface, resource allocation information of a neighboring cell of a serving cell in which UE is located, a network device may allocate a resource to the UE based on the resource allocation information of the neighboring cell, so as to prevent the UE from using a same resource as UE located in the neighboring cell, and reduce interference to the neighboring cell; or allocate, to the UE, a resource with relatively small interference to the UE, so as to reduce interference of the neighboring cell to the UE. The first interface is an interface that performs communication by using a UE-to-UE communications technology. The second interface is an interface that performs communication by using a UE-to-network device communications technology.

16 Claims, 13 Drawing Sheets

(51) Int. Cl.
*H04W 88/06* (2009.01)
*H04W 4/70* (2018.01)
*H04W 24/10* (2009.01)
*H04W 48/12* (2009.01)
*H04W 88/10* (2009.01)

(52) U.S. Cl.
CPC ....... *H04W 72/0406* (2013.01); *H04W 88/06* (2013.01); *H04W 88/10* (2013.01); *H04W 92/20* (2013.01)

(58) Field of Classification Search
CPC ........... H04W 72/0453; H04W 72/082; H04W 24/02; H04L 5/0053
See application file for complete search history.

(56) References Cited

U.S. PATENT DOCUMENTS

| | | | | |
|---|---|---|---|---|
| 2011/0310747 | A1* | 12/2011 | Seo | H04B 7/2606 370/246 |
| 2012/0088507 | A1* | 4/2012 | Legg | H04W 36/245 455/436 |
| 2012/0140706 | A1* | 6/2012 | Doppler | H04L 5/0092 370/328 |
| 2013/0216043 | A1 | 8/2013 | Ginzboorg et al. | |
| 2015/0045032 | A1 | 2/2015 | Tomici et al. | |
| 2017/0111946 | A1* | 4/2017 | Cheng | H04W 76/14 |

FOREIGN PATENT DOCUMENTS

| | | | | |
|---|---|---|---|---|
| CN | 102246580 | A | | 11/2011 |
| CN | 103002578 | A | | 3/2013 |
| CN | 103002593 | A | * | 3/2013 |
| CN | 103002593 | A | | 3/2013 |
| CN | 103024885 | A | | 4/2013 |
| CN | 103369693 | A | | 10/2013 |
| CN | 103493529 | A | | 1/2014 |
| CN | 103906174 | A | | 7/2014 |
| CN | 104170422 | A | | 11/2014 |
| CN | 104365140 | A | | 2/2015 |
| CN | 102687565 | B | | 6/2015 |
| CN | 104838683 | A | | 8/2015 |
| CN | 105208626 | A | | 12/2015 |
| CN | 105309026 | A | | 2/2016 |
| EP | 2983432 | A1 | | 2/2016 |
| EP | 3142451 | A1 | | 3/2017 |
| WO | WO-2010151079 | A2 | * | 12/2010 ............ H04W 72/00 |
| WO | 2011097822 | A1 | | 8/2011 |
| WO | 2012101482 | A1 | | 8/2012 |
| WO | 2014195765 | A1 | | 12/2014 |
| WO | 2015115969 | A1 | | 8/2015 |
| WO | 2015170730 | A1 | | 11/2015 |

* cited by examiner

RESOURCE ALLOCATION METHOD AND RELEVANT DEVICE

CROSS-REFERENCE TO RELATED APPLICATIONS

This application is a continuation of International Application No. PCT/CN2016/082137, filed on May 13, 2016, the disclosure of which is hereby incorporated by reference in its entirety.

TECHNICAL FIELD

Embodiments of the present invention relate to the field of communications technologies, and in particular, to a resource allocation method and a related device.

BACKGROUND

In a mobile communications system, each base station may provide one or more cells. An edge of a cell provided by a base station may overlap with a cell provided by a neighboring base station. Therefore, when transmitting data, user equipment (User Equipment, UE) located at a cell edge (also referred to as an edge user) may be affected due to mutual signal interference between cells.

To resolve the foregoing problem, in the prior art, when an edge user has a data transmission requirement, a plurality of base stations in different geographical locations may cooperatively participate in resource allocation for the edge user, to avoid mutual interference between edge users of neighboring cells. However, when the plurality of base stations cooperatively participate in the resource allocation for the edge user, massive data exchange may occur between base stations, thereby increasing signaling overheads of an X2 interface between the base stations.

SUMMARY

Embodiments of the present invention disclose a resource allocation method and a related device, to reduce signaling overheads of an X2 interface between base stations.

A first aspect of the embodiments of the present invention discloses a resource allocation method. The method includes:

receiving, by a first network device through an interface, resource allocation information of a neighboring cell of a serving cell in which first UE is located, where a network device to which the neighboring cell belongs is different from the first network device, the interface may include a first interface or a second interface, the first interface is an interface that performs communication by using a UE-to-UE communications technology, such as a PC5 interface, an interface between devices paired through Bluetooth, or an interface between devices connected through Wireless Fidelity (Wireless Fidelity, Wi-Fi), and the second interface is an interface that performs communication by using a UE-to-network device communications technology, such as a Uu interface; and allocating, by the first network device, a resource to the first UE based on the resource allocation information of the neighboring cell, where the resource is specifically a wireless communications resource.

Specifically, the first network device allocates the resource to the first UE with reference to the resource allocation information of the neighboring cell, so as to avoid a conflict with a resource of nearby UE connected to another network device, and avoid interference to the first network device in receiving uplink data of the first UE, or avoid interference to another UE in the neighboring cell of the serving cell in which the first UE is located in receiving downlink data.

The first network device may receive, through the PC5 interface or the Uu interface, the resource allocation information, reported by the first UE, of the neighboring cell of the serving cell in which the first UE is located; or may receive, through the PC5 interface, the resource allocation information, sent by another network device, of the neighboring cell of the serving cell in which the first UE is located, so that the first network device may allocate the resource to the first UE based on the resource allocation information of the neighboring cell, so as to prevent the first UE from using a same resource as UE located in the neighboring cell, and reduce interference to the neighboring cell; or may allocate, to the first UE, a resource with relatively small interference to the UE, so as to reduce interference of the neighboring cell to the first UE. In this manner, signaling overheads of an X2 interface between network devices can be reduced, and efficiency for allocating a resource to UE can be further improved when a system network is relatively congested, so that a data transmission delay of UE can be reduced to some extent.

Optionally, the first network device may further receive, through the interface, a measurement result reported by the first UE; and if the measurement result is less than a threshold, receive, through the interface, the resource allocation information of the neighboring cell of the serving cell in which the first UE is located. The measurement result is a measurement result obtained after the first UE performs signal measurement on a reference signal sent by the first network device.

The measurement result may include but is not limited to at least one of a signal to interference plus noise ratio (Signal to Interference plus Noise Ratio, SINR), reference signal received power (Reference Signal Receiving Power, RSRP), and reference signal received quality (Signal Receiving Quality, RSRQ).

In this manner, the first network device obtains, only when allocating a resource to UE at a network edge, resource allocation information of a neighboring cell of a serving cell in which the UE is located. This can improve efficiency for allocating a resource to UE that is not at a network edge.

Optionally, a specific manner of receiving, by the first network device through the interface, the resource allocation information of the neighboring cell of the serving cell in which the first UE is located may be:

sending a request message through the first interface, where the request message is used to request to obtain the resource allocation information of the neighboring cell of the serving cell in which the first UE is located, and the request message may further carry a cell identity of the serving cell in which the first UE is located; and receiving, through the first interface, the resource allocation information of the neighboring cell that is fed back by a second network device according to the request message, where the second network device is the network device to which the neighboring cell belongs.

Optionally, a specific manner of receiving, by the first network device through the interface, the resource allocation information of the neighboring cell of the serving cell in which the first UE is located may alternatively be:

receiving, through the first interface, resource allocation information, sent by a second network device, of each cell managed by the second network device; and determining, from the resource allocation information of each cell, the resource allocation information of the neighboring cell of the serving cell in which the first UE is located.

A network device obtains, from another network device by using a PC5 interface, resource allocation information of a neighboring cell of a serving cell in which UE is located. This can reduce signaling overheads of an X2 interface, and can further improve efficiency for allocating a resource to UE when a system network is relatively congested, so that a data transmission delay of UE can be reduced to some extent.

Optionally, a specific manner of receiving, by the first network device through the interface, the resource allocation information of the neighboring cell of the serving cell in which the first UE may alternatively be:

receiving, through the interface, the resource allocation information, reported by the first UE, of the neighboring cell of the serving cell in which the first UE is located.

UE collects resource allocation information of a neighboring cell of a serving cell in which the UE is located, and reports the resource allocation information to a network device. This can reduce signaling overheads of an X2 interface between network devices.

A second aspect of the embodiments of the present invention discloses a network device. The network device may include a transceiver module, a processing module, and the like, and may be configured to perform the resource allocation method disclosed in the first aspect.

A third aspect of the embodiments of the present invention discloses another network device. The network device may include a transceiver, a processor, and the like. The transceiver is corresponding to the transceiver module of the network device disclosed in the second aspect. The processor is corresponding to the processing module of the network device disclosed in the second aspect. The network device may be configured to perform the resource allocation method disclosed in the first aspect.

A fourth aspect of the embodiments of the present invention discloses another resource allocation method. The method includes:

receiving, by first UE, resource allocation information of a neighboring cell of a serving cell in which the first UE is located, where a network device to which the neighboring cell belongs is different from a first network device connected to the first UE; and reporting, by the first UE, the resource allocation information of the neighboring cell to the first network device by using an interface, where the resource allocation information of the neighboring cell is used by the first network device to allocate a resource to the first UE, the interface includes a first interface or a second interface, the first interface is an interface that performs communication by using a UE-to-UE communications technology, such as a PC5 interface, an interface between devices paired through Bluetooth, or an interface between devices connected through Wi-Fi, and the second interface is an interface that performs communication by using a UE-to-network device communications technology, such as a Uu interface.

Specifically, after receiving the resource allocation information of the neighboring cell that is reported by the first UE, the first network device allocates the resource to the first UE with reference to the resource allocation information of the neighboring cell, so as to avoid a conflict with a resource of nearby UE connected to another network device, and avoid interference to the first network device in receiving uplink data of the first UE, or avoid interference to another UE in the neighboring cell of the serving cell in which the first UE is located in receiving downlink data.

UE collects resource allocation information of a neighboring cell of a serving cell in which the UE is located, and reports the resource allocation information to a network device. This can reduce signaling overheads of an X2 interface between network devices.

Optionally, after receiving the resource allocation information of the neighboring cell of the serving cell in which the first UE is located, the first UE may further perform signal measurement on a reference signal sent by the first network device, to obtain a first measurement result; determine whether the first measurement result is less than a first threshold; and if the first measurement result is less than the first threshold, report the resource allocation information of the neighboring cell to the first network device by using the interface.

In this manner, the first UE reports, to the first network device only when the first UE is located at a network edge of the first network device, the obtained resource allocation information of the neighboring cell of the serving cell in which the first UE is located, to request the first network device to allocate the resource to the first UE. This can improve efficiency for allocating, by a network device, a resource to UE at a network edge.

Optionally, a specific manner of receiving, by the first UE, the resource allocation information of the neighboring cell of the serving cell in which the first UE is located may be:

receiving, through the first interface, resource occupation information that is sent by at least one second UE and that is of the second UE, where the resource occupation information is information about a resource allocated to the second UE by a network device connected to the second UE, the resource occupation information carries a cell identity of a serving cell in which the second UE is located, the serving cell in which the second UE is located is the neighboring cell of the serving cell in which the first UE is located, and the network device connected to the second UE and the first network device are different network devices; and determining, based on the cell identity, resource occupation information carrying a same cell identity from the resource occupation information that is sent by the at least one second UE and that is of the second UE, and determining, based on the resource occupation information carrying the same cell identity, resource allocation information of a cell marked by the same cell identity.

Each UE may broadcast resource occupation information of the UE. After receiving resource occupation information broadcast by each UE in the neighboring cell, the first UE may determine resource occupation information of each neighboring cell based on a cell identity carried in the resource occupation information, and then report the obtained resource allocation information to the first network device. This can prevent network devices from exchanging resource allocation information by using an X2 interface, and can reduce signaling overheads of the X2 interface.

Optionally, before receiving, through the first interface, the resource occupation information that is sent by the at least one second UE and that is of the second UE, the first UE may further send a first request message through the first interface, where the first request message is used to request to obtain resource occupation information of UE in the neighboring cell of the serving cell in which the first UE is located, and the first request message carries a cell identity of the serving cell in which the first UE is located.

The first UE may send a request to nearby UE, to obtain resource occupation information of each UE in the neighboring cell and obtain resource allocation information of the neighboring cell; and then report the obtained resource allocation information to the first network device. This can prevent network devices from exchanging resource allocation information by using an X2 interface, and can reduce signaling overheads of the X2 interface.

Optionally, a specific manner of receiving, by the first UE, the resource allocation information of the neighboring cell of the serving cell in which the first UE is located may alternatively be:

sending a second request message to a second network device through the first interface, where the second network device is the network device to which the neighboring cell of the serving cell in which the first UE is located belongs, and the second request message is used to request to obtain the resource allocation information of the neighboring cell; and receiving, through the first interface, the resource allocation information of the neighboring cell that is sent by the second network device according to the second request message, and the third request message carries a cell identity of the serving cell in which the first UE is located.

The first UE may send, through the PC5 interface, a request to the network device to which the neighboring cell belongs, to obtain the resource allocation information of the neighboring cell. This can prevent network devices from exchanging resource allocation information by using an X2 interface, and can reduce signaling overheads of the X2 interface.

Optionally, a specific manner of receiving, by the first UE, the resource allocation information of the neighboring cell of the serving cell in which the first UE is located may alternatively be:

receiving, through the first interface or the second interface, resource allocation information, sent by a second network device, of each cell managed by the second network device; and determining, from the resource allocation information of each cell, the resource allocation information of the neighboring cell of the serving cell in which the UE is located, where the second network device is the network device to which the neighboring cell belongs, and the resource allocation information, sent by the second network device, of each cell managed by the second network device carries a cell identity of a corresponding cell.

A network device may broadcast, to UE by using the first interface or the second interface, resource allocation information of each cell managed by the network device. After receiving the resource allocation information of each cell, the first UE may determine, from the resource allocation information of each cell, the resource allocation information of the neighboring cell of the serving cell in which the first UE is located; and report the resource allocation information to the first network device. This can prevent network devices from exchanging resource allocation information by using an X2 interface, and can reduce signaling overheads of the X2 interface.

Specifically, a specific manner of determining, by the first UE based on the cell identity, the resource occupation information carrying the same cell identity from the resource occupation information that is sent by the at least one second UE and that is of the second UE may be:

if the resource occupation information further carries a second measurement result, determining, based on the cell identity, the resource occupation information carrying the same cell identity from the resource occupation information that is sent by the at least one second UE and that is of the second UE and whose second measurement result is less than a second threshold, where the second measurement result is a measurement result obtained after the second UE performs signal measurement on a reference signal sent by the network device connected to the second UE.

In this manner, the first UE may determine resource occupation information of UEs at an edge of the neighboring cell, and because the first UE can receive the resource occupation information sent by the UEs, the first UE may determine that the UEs are located at the edge of the neighboring cell and are relatively close to the first UE. Usually, UE at a coverage edge of a cell performs uplink transmission by using relatively large power, thereby causing relatively large interference to a neighboring cell. In addition, a base station sends a downlink signal to edge UE also by using relatively large power, thereby causing relatively large interference to edge UE in a neighboring cell. If the first UE reports the resource occupation information of the UEs to the first network device, when the first network device allocates the resource to the first UE, a conflict with a resource occupied by the UEs can be avoided, thereby reducing interference to the first UE and the UEs.

Specifically, a specific manner of determining, by the first UE based on the cell identity, the resource occupation information carrying the same cell identity from the resource occupation information that is sent by the at least one second UE and that is of the second UE may alternatively be:

performing signal measurement on a reference signal sent by the second UE, to obtain a third measurement result, and determining, based on the cell identity, the resource occupation information carrying the same cell identity from the resource occupation information that is sent by the at least one second UE and that is of the second UE and whose third measurement result is greater than a third threshold.

In this manner, the first UE may determine UE relatively close to the first UE, and the first UE determines the resource allocation information of the neighboring cell based on resource occupation information of the relatively close UE. This can improve accuracy for obtaining resource allocation information, of the neighboring cell, about a resource that may interfere with the first UE. Therefore, when the first network device allocates the resource to the first UE, impact on data transmission of UE at a coverage edge of the neighboring cell can be more effectively avoided, or the first UE can be prevented from being affected by UE at a coverage edge of the neighboring cell.

A fifth aspect of the embodiments of the present invention discloses user equipment. The user equipment may include a transceiver module, a processing module, and the like, and may be configured to perform the resource allocation method disclosed in the fourth aspect.

A sixth aspect of the embodiments of the present invention discloses another user equipment. The user equipment may include a transceiver, a processor, and the like. The transceiver is corresponding to the transceiver module of the user equipment disclosed in the fifth aspect. The processor is corresponding to the processing module of the user equipment disclosed in the fifth aspect. The user equipment may be configured to perform the resource allocation method disclosed in the fourth aspect.

A seventh aspect of the embodiments of the present invention discloses still another resource allocation method. The method includes:

receiving, by second UE through an interface, a request message sent by first UE, where the request message is used to request to obtain resource occupation information of UE in a neighboring cell of a serving cell in which the first UE is located, the interface is an interface that performs communication by using a UE-to-UE communications technology, such as a PC5 interface, an interface between devices paired through Bluetooth, or an interface between devices connected through Wi-Fi, and the request message may include a cell identity of the serving cell in which the first UE is located, and an identifier of a first network device connected to the first UE; and if the second UE determines, based on the cell identity, that a serving cell in which the second UE is located is the neighboring cell of the serving cell in which the first UE is located, and determines, based on the identifier of the first network device, that a network device connected to the second UE is different from the network device, sending, by the second UE, resource occupation information of the second UE to the first UE through the interface.

After receiving the request message that is sent by the first UE and that is used to obtain the resource occupation information of the UE in the neighboring cell, the UE in the neighboring cell sends the resource occupation information of the UE to the first UE through the PC5 interface. The first UE determines resource allocation information of the neighboring cell based on the resource occupation information, so that the network device connected to the first UE may allocate a resource to the first UE based on the resource allocation information of the neighboring cell. This can more effectively avoid impact on data transmission of the UE in the neighboring cell, or avoid impact from the UE in the neighboring cell.

Optionally, after receiving the request message, the second UE may further perform signal measurement on a reference signal sent by the network device connected to the second UE, to obtain a first measurement result; and if the first measurement result is less than a first threshold, send the resource occupation information of the second UE to the first UE through the interface.

In this manner, after receiving the request message sent by the first UE, the second UE sends the resource occupation information of the second UE to the first UE only when determining that the second UE is located at a network coverage edge. This can improve accuracy for obtaining, by the first UE, resource allocation information, of the neighboring cell, about a resource that may interfere with the first UE. Therefore, when the network device connected to the first UE allocates the resource to the first UE, impact on data transmission of UE at a coverage edge of the neighboring cell can be more effectively avoided, or impact from UE at a coverage edge of the neighboring cell can be avoided.

Optionally, a specific manner of sending, by the second UE, the resource occupation information of the second UE to the first UE through the interface may be:

if the request message further includes a second measurement result obtained after the first UE performs signal measurement on a reference signal sent by the network device connected to the first UE, and the second measurement result is less than a second threshold, sending the resource occupation information of the second UE to the first UE through the interface.

When receiving the request message, the second UE may determine whether the first UE is located at a network coverage edge of the network device connected to the first UE. The second UE sends the resource occupation information of the second UE to the first UE only if the first UE is located at the network coverage edge of the network device connected to the first UE. This can avoid sending the resource occupation information of the second UE to UE that is not at the network coverage edge of the first network device, and can avoid transmission of unnecessary information and reduce signaling overheads of the first interface.

An eighth aspect of the embodiments of the present invention discloses still another user equipment. The user equipment may include a transceiver module, a processing module, and the like, and may be configured to perform the resource allocation method disclosed in the seventh aspect.

A ninth aspect of the embodiments of the present invention discloses still another user equipment. The user equipment may include a transceiver, a processor, and the like. The transceiver is corresponding to the transceiver module of the user equipment disclosed in the eighth aspect. The processor is corresponding to the processing module of the user equipment disclosed in the eighth aspect. The user equipment may be configured to perform the resource allocation method disclosed in the seventh aspect.

A tenth aspect of the embodiments of the present invention further discloses a resource allocation system. The system may include the network device and the user equipment described above. In the system, a first network device may receive, through a PC5 interface or a Uu interface, resource allocation information, reported by first UE, of a neighboring cell of a serving cell in which the first UE is located; or may receive, through a PC5 interface, resource allocation information, sent by another network device, of a neighboring cell of a serving cell in which first UE is located, so that the first network device may allocate a resource to the first UE based on the resource allocation information of the neighboring cell, so as to prevent the first UE from using a same resource as UE located in the neighboring cell, and reduce interference to the neighboring cell; or may allocate, to the first UE, a resource with relatively small interference to the UE, so as to reduce interference of the neighboring cell to the first UE. In this manner, signaling overheads of an X2 interface between network devices can be reduced, and efficiency for allocating a resource to UE can be further improved when a system network is relatively congested, so that a data transmission delay of UE can be reduced to some extent.

An eleventh aspect of the embodiments of the present invention discloses still another resource allocation method. The method includes:

establishing, by UE based on a first service type of to-be-transmitted D2D data, a logical channel corresponding to the first service type, and determining, from a resource allocated based on resource allocation information, a resource used to carry the to-be-transmitted D2D data on the logical channel.

The first service type includes an Internet of Vehicles service, and the Internet of Vehicles service may be a V2X service. The logical channel corresponding to the first service type may be understood as: establishing a dedicated logical channel for D2D data of the V2X service; or establishing a D2D logical channel, to be specific, establishing a logical channel by using a process of establishing a logical channel for D2D data of a PS service, where logical channels used to carry D2D data of the V2X service and logical channels used to carry the D2D data of the PS service need to be marked. Specifically, when establishing the logical channel for the to-be-transmitted D2D data, the UE may mark an identifier of the first service type on the logical channel.

Specifically, the resource allocated based on the resource allocation information may be a resource used to carry D2D data. The resource allocation information may include carrier information, for example, a carrier frequency, a service that may be performed at a carrier frequency, and information about a PRB used to carry D2D data. This is not limited in this embodiment of the present invention. The resource allocation information of the UE may further include a service type of data carried on the corresponding resource. Then the UE may select, based on the service type and from the resource carrying the D2D data, a resource used to carry D2D data of the first service type. In this way, the UE may send the to-be-transmitted D2D data on the resource.

Optionally, before determining, from the resource allocated based on the resource allocation information, the resource used to carry the to-be-transmitted D2D data on the logical channel, the UE may first obtain resource allocation information of the resource used to carry D2D data. The resource allocation information may include a data carrying manner of the resource used to carry D2D data.

Then, a specific manner of determining, by the UE from the resource allocated based on the resource allocation information, the resource used to carry the to-be-transmitted D2D data on the logical channel may be:

determining, according to the data carrying manner and from the resource used to carry D2D data, the resource used to carry the to-be-transmitted D2D data on the logical channel.

It should be noted that there are two data carrying manners for the resource used to carry D2D data (also referred to as usages of the resource allocated based on the resource allocation information): an exclusive resource manner and a shared resource manner. The exclusive resource manner is: sending D2D data of different service types by using different resources. The shared resource manner is: sending D2D data of different service types by using a same resource. Then, after determining the data carrying manner of the resource used to carry D2D data, the UE may determine, according to the specific data carrying manner and from the resource allocated based on the resource allocation information, the resource used to carry the to-be-transmitted D2D data on the logical channel.

Optionally, when the data carrying manner is the exclusive resource manner, the resource allocation information may further include a second service type of D2D data carried on the resource used to carry D2D data. Then the UE may determine, as the resource used to carry the to-be-transmitted D2D data on the logical channel, a resource that is in the resource used to carry D2D data and that carries D2D data whose second service type is consistent with the first service type.

Optionally, a specific manner of obtaining, by the UE, the resource allocation information of the resource used to carry D2D data may be:

obtaining, from a preconfigured resource, the resource allocation information of the resource used to carry D2D data; or receiving the resource allocation information, sent by a network device, of the resource used to carry D2D data.

In this manner, UE may mark a logical channel based on a service type of D2D data generated by the UE, and then may exclusively occupy a resource in a D2D data transmission process by distinguishing a data carrying manner of a resource allocated based on resource allocation information that comes from a network device or that is preconfigured by the UE. This can improve flexibility of resource utilization and can reduce power consumption for receiving data at a receive end.

A twelfth aspect of the embodiments of the present invention discloses still another user equipment. The user equipment may include a transceiver module, a processing module, and the like, and may be configured to perform the resource allocation method disclosed in the eleventh aspect.

A thirteenth aspect of the embodiments of the present invention discloses still another user equipment. The user equipment may include a transceiver, a processor, and the like. The transceiver is corresponding to the transceiver module of the user equipment disclosed in the twelfth aspect. The processor is corresponding to the processing module of the user equipment disclosed in the twelfth aspect. The user equipment may be configured to perform the resource allocation method disclosed in the eleventh aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

The embodiments of the present invention disclose a resource allocation method and a related device, to reduce signaling overheads of an X2 interface between base stations. The following separately provides detailed descriptions.

Figure 1:
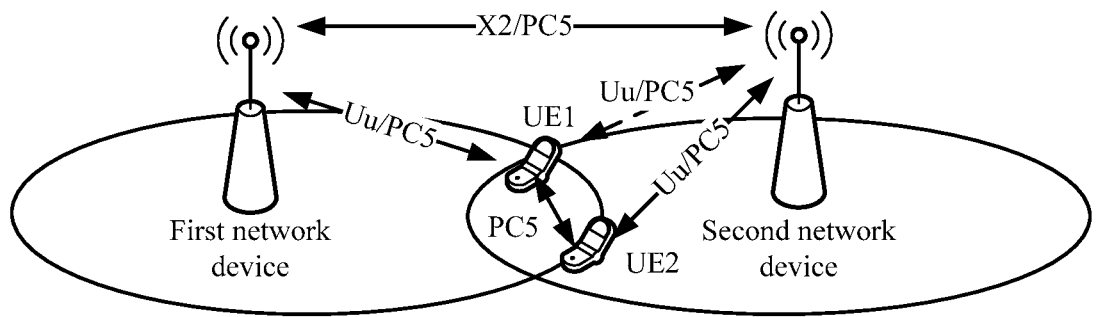
FIG. 1 is a schematic architectural diagram of a communications network according to an embodiment of the present invention.

To better understand the resource allocation method and the related device disclosed in the embodiments of the present invention, the following first describes a communications network architecture applicable to the embodiments of the present invention. FIG. 1 is a schematic architectural diagram of a communications network according to an embodiment of the present invention. The network architecture shown in FIG. 1 includes a first network device, a second network device, UE 1, and UE 2. In this application, the network devices may include but are not limited to an evolved NodeB (evolved NodeB, eNB), a wireless network controller, a base station controller, an access point (Access Point, AP), and the like. The user equipments UEs may include but are not limited to various handheld devices, in-vehicle devices, wearable devices, and computer devices that have a wireless communication function, or other processing devices connected to wireless modems, and various forms of user devices, mobile stations (Mobile Station, MS), terminals (terminal), terminal equipment (Terminal Equipment), and the like. For ease of description, in this application, the aforementioned devices are collectively referred to as user equipment or UE. Interfaces between the first network device and the second network device may include but are not limited to an X2 interface and a PC5 interface. A cell corresponding to the second network device may be horizontally neighboring to a cell corresponding to the first network device (for example, two neighboring eNBs, or two neighboring small cells in a network coverage area of an eNB); or may be in a network coverage area of a cell corresponding to the first network device (for example, a small cell is set in the network coverage area of the first network device). When the network devices are eNBs, the UE 1 is located at a network coverage edge of the first network device, and may communicate with the first network device by using a Uu interface. The first network device may allocate a wireless communications resource (referred to as a resource in the following) to the UE 1. The UE 2 is located at a network coverage edge of the second network device, is near the UE 1, and may communicate with the second network device by using a Uu interface. The UE 1 may further communicate with the first network device by using a PC5 interface. The UE 2 may further communicate with the second network device by using a PC5 interface. The UE 1 and the UE 2 communicate with each other by using a PC5 interface. The UE 1 may send data to the second network device through the PC5 interface or receive, through the PC5 interface, data sent by the second network device; or may receive, through the Uu interface, data broadcast by the second network device.

Further, the first network device and the second network device may cooperatively provide a downlink data transmission service for the UE 1. For example, the first network device and the second network device send data to the UE 1 on a same resource. The UE 1 feeds back, to the first network device, a channel state information (Channel State Information, CSI) report and information about whether the data is correctly received; and feeds back, to the second network device by using the UE 2, a CSI report and information about whether the data is correctly received. The CSI report includes a channel quality indication (Channel Quality Indication, CQI), a precoding matrix indication (Precoding Matrix Indication, PMI), a rank indication (Rank Indication, RI), and the like. The second network device adjusts, based on information fed back by the UE 1, a resource and power for sending data to the UE 1; or if data transmission fails, determines whether to perform retransmission; or the like.

By implementing the network architecture shown in FIG. 1, if there is uplink data transmission, the UE 1 reports uplink resource allocation information of a neighboring cell to the first network device; or if the UE 1 has downlink data, the first network device obtains, by using the PC5 interface, downlink resource allocation information of a neighboring cell of a serving cell in which the UE 1 is located, and therefore the first network device may allocate a resource to the UE 1 based on the resource allocation information of the neighboring cell. When the first network device and the second network device cooperatively provide the downlink data transmission service for the UE 1, the UE 1 sends feedback information to the second network device by using the UE 2. This can reduce information exchange between the first network device and the second network device. In this manner, a network device may obtain UE-related information by using a PC5 interface or a Uu interface, so as to reduce signaling overheads of an X2 interface between base stations.

Figure 2:
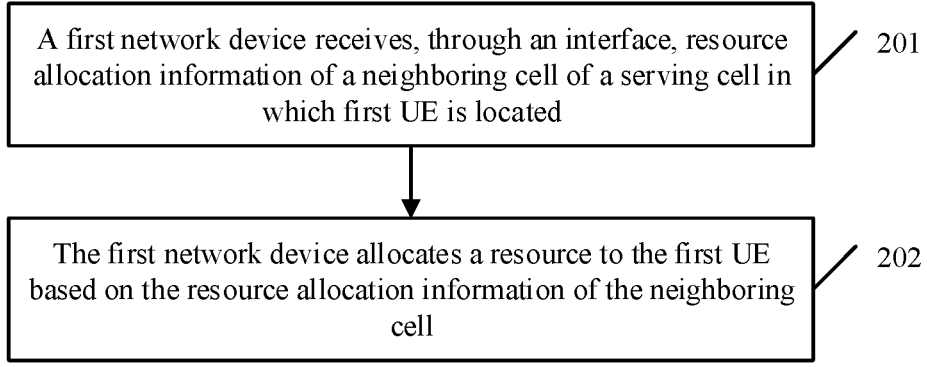
FIG. 2 is a schematic flowchart of a resource allocation method according to an embodiment of the present invention.

Based on the network architecture shown in FIG. 1, an embodiment of the present invention discloses a resource allocation method. FIG. 2 is a schematic flowchart of a resource allocation method according to an embodiment of the present invention. The method shown in FIG. 2 may be applied to a network device. As shown in FIG. 2, the resource allocation method may include the following steps.

201: A first network device receives, through an interface, resource allocation information of a neighboring cell of a serving cell in which first UE is located.

In this embodiment of the present invention, a communications connection is established between the first UE and the first network device. The interface may include a first interface or a second interface. The first interface is an interface that performs communication by using a UE-to-UE communications technology, and may be a PC5 interface, an interface between devices paired through Bluetooth, or an interface between devices connected through Wi-Fi. The second interface is an interface that performs communication by using a UE-to-network device communications technology, and may be a Uu interface. The neighboring cell of the serving cell in which the first UE is located means that the cell is adjacent to the serving cell in which the first UE is located, and a network device to which the cell belongs and the first network device are different network devices. The resource allocation information of the neighboring cell is a set of resource occupation information of some or all UEs served by the neighboring cell. Resource occupation information of UE is information related to a resource allocated by a network device to the UE, for example, information about physical resource blocks (Physical Resource Block, PRB) on which the UE transmits data, and times at which the UE transmits data. The resource allocated by the network device to the UE may include at least one of a frequency domain resource and a time resource, and the resource includes an uplink resource and a downlink resource.

In this embodiment of the present invention, the first network device may receive, through the first interface, the resource allocation information, sent by another network device, of the neighboring cell of the serving cell in which the first UE is located; or may receive, through the first interface or the second interface, the resource allocation information of the neighboring cell that is reported by the first UE. This is not limited in this embodiment of the present invention.

It should be noted that, if the first network device needs to allocate a downlink resource to the first UE, the first network device may receive resource allocation information, sent by the first UE or another network device, of a downlink resource of the neighboring cell of the serving cell in which the first UE is located; or if the first UE requires the first network device to allocate an uplink resource to the first UE, the first UE may collect uplink resource allocation information of the neighboring cell, and report the uplink resource allocation information to the first network device.

202: The first network device allocates a resource to the first UE based on the resource allocation information of the neighboring cell.

In this embodiment of the present invention, after receiving the resource allocation information of the neighboring cell of the serving cell in which the first UE is located, the first network device may allocate the resource to the first UE based on the resource allocation information of the neighboring cell.

Specifically, the first network device allocates the resource to the first UE with reference to the resource allocation information of the neighboring cell, so as to avoid a conflict with a resource of nearby UE connected to another network device, and avoid interference to the first network device in receiving uplink data of the first UE, or avoid interference to another UE in the neighboring cell of the serving cell in which the first UE is located in receiving downlink data.

It can be learned that, in the method shown in FIG. 2, the first network device may receive, through the PC5 interface or the Uu interface, the resource allocation information, reported by the first UE, of the neighboring cell of the serving cell in which the first UE is located; or may receive, through the PC5 interface, the resource allocation information, sent by the another network device, of the neighboring cell of the serving cell in which the first UE is located, so that the first network device may allocate the resource to the first UE based on the resource allocation information of the neighboring cell, so as to prevent the first UE from using a same resource as UE located in the neighboring cell, and reduce interference to the neighboring cell; or may allocate, to the first UE, a resource with relatively small interference to the UE, so as to reduce interference of the neighboring cell to the first UE. In this manner, signaling overheads of an X2 interface between network devices can be reduced, and efficiency for allocating a resource to UE can be further improved when a system network is relatively congested, so that a data transmission delay of UE can be reduced to some extent.

Figure 3:
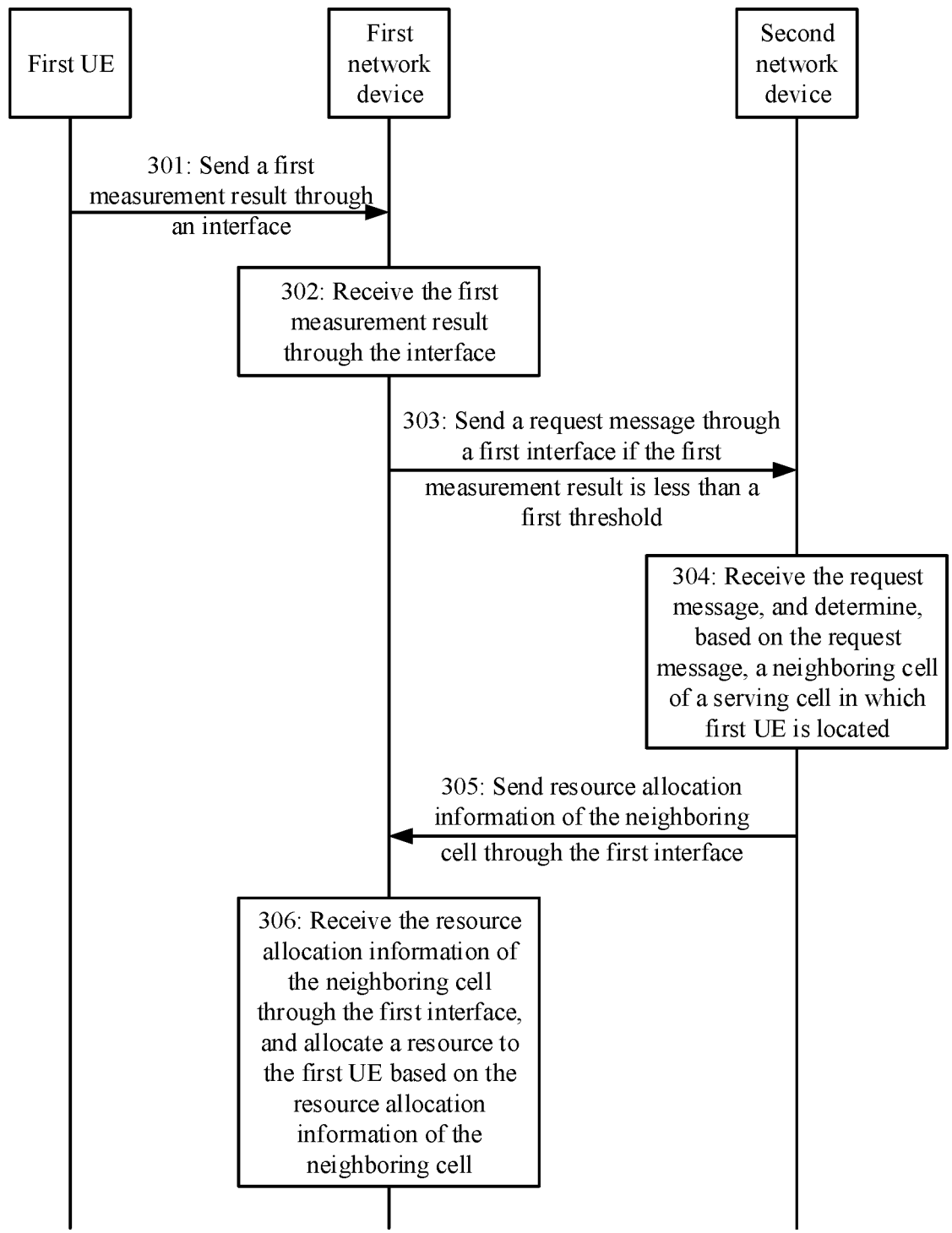
FIG. 3 is a schematic flowchart of another resource allocation method according to an embodiment of the present invention.

Based on the network architecture shown in FIG. 1, an embodiment of the present invention discloses another resource allocation method. FIG. 3 is a schematic flowchart of another resource allocation method according to an embodiment of the present invention. As shown in FIG. 3, the resource allocation method may include the following steps.

301: First UE sends a first measurement result to a first network device through an interface.

In this embodiment of the present invention, the first UE establishes a connection to the first network device by using a first interface and a second interface. When receiving a reference signal sent by a second network device, the first UE may perform signal measurement on the reference signal, to obtain the first measurement result; and send the first measurement result to the first network device through the interface (the first interface or the second interface).

The first measurement result may include but is not limited to at least one of an SINR, RSRP, and RSRQ.

Further, if the first UE has an uplink data transmission requirement, the first UE my send a resource allocation request message to the first network device. The request message may include a buffer status report (Buffer Status Report, BSR). The request message may be independently sent to the first network device, or may be sent to the first network device together with the first measurement result. This is not limited in this embodiment of the present invention.

302: The first network device receives the first measurement result through the interface.

303: The first network device sends a request message through a first interface if the first measurement result is less than a first threshold.

In this embodiment of the present invention, after receiving the first measurement result sent by the first UE, the first network device may detect whether the first measurement result is less than the first threshold. The first threshold is a critical value for determining whether the first UE is located at a network coverage edge of the first network device. If the first network device receives a resource allocation request sent by the first UE and determines that the first measurement result is less than the first threshold, the first network device may broadcast the request message by using the first interface or send the request message to another network device through the first interface. The request message is used to request to obtain resource allocation information of a neighboring cell of a serving cell in which the first UE is located. If the first network device detects downlink data of the UE 1 and determines that the first measurement result is less than the first threshold, the first network device may also broadcast the request message by using the first interface or send the request message to another network device through the first interface.

In this manner, the first network device may determine UEs at an edge of a cell managed by the first network device. When allocating an uplink resource to the UEs, the first network device needs to send uplink data by using relatively large transmit power because the UEs are located at the edge of the cell. This may interfere with a neighboring network device in receiving uplink data of UE in the neighboring cell. In addition, when allocating a downlink resource to the UEs, the first network device needs to send downlink data by using relatively large power because the UEs are located at the edge of the cell. This may interfere with UE in the neighboring cell in receiving downlink data.

Further, the request message may carry an identifier of the first network device and an identity of the serving cell in which the first UE is located.

304: A second network device receives the first request message, and determines, based on the request message, a neighboring cell of a serving cell in which the first UE is located.

In this embodiment of the present invention, the second network device may be one network device, or may be a plurality of network devices. This is not limited in this embodiment of the present invention. After receiving the first request message, the second network device may determine, based on the cell identity that is carried in the first request message and that is of the serving cell in which the first UE is located, whether cells managed by the second network device include the neighboring cell of the serving cell in which the first UE is located. If the cells include the neighboring cell, the second network device further determines the resource allocation information of the neighboring cell.

It should be noted that there may be one or more neighboring cells. The resource allocation information of the neighboring cell may include information about resources occupied by all UEs in the neighboring cell, or may include only information about a resource occupied by UE that is located at a network coverage edge of the neighboring cell and that is close to the serving cell of the first UE. This is not limited in this embodiment of the present invention.

305: The second network device sends resource allocation information of the neighboring cell to the first network device through the first interface.

In this embodiment of the present invention, after determining the resource allocation information of the neighboring cell, the second network device may send the resource allocation information of the neighboring cell to the first network device through the first interface. The resource allocation information carries a cell identity of the neighboring cell.

Optionally, the second network device may broadcast, by using the first interface, resource allocation information of the cells managed by the second network device; or may send, to the first network device through the first interface, resource allocation information of the cells managed by the second network device. The resource allocation information of the cells also carries cell identities of the cells. Then, after receiving the resource allocation information of the cells that is sent by the second network device, the first network device may determine, based on the cell identities of the cells and from the resource information of the cells, the resource allocation information of the neighboring cell of the serving cell in which the first UE is located.

306: The first network device receives the resource allocation information of the neighboring cell through the first interface, and allocates a resource to the first UE based on the resource allocation information of the neighboring cell.

It can be learned that, in the method shown in FIG. 3, the first network device may send the request message to the second network device through the first interface, to request to obtain the resource allocation information of the neighboring cell of the serving cell in which the first UE is located; and receive the resource allocation information of the neighboring cell that is sent by the second network device according to the request message. Alternatively, the second network device may directly send, to the first network device through the first interface, the resource allocation information of the cells managed by the second network device; and the first network device selects, from the resource allocation information of the cells, the resource allocation information of the neighboring cell of the serving cell in which the first UE is located. In this manner, a network device can be prevented from obtaining resource allocation information of a neighboring cell from another network device by using an X2 interface when the network device allocates a resource to UE. This can reduce signaling overheads of an X2 interface between network devices, and can improve efficiency for obtaining resource allocation information when a system network is congested.

Figure 4A:
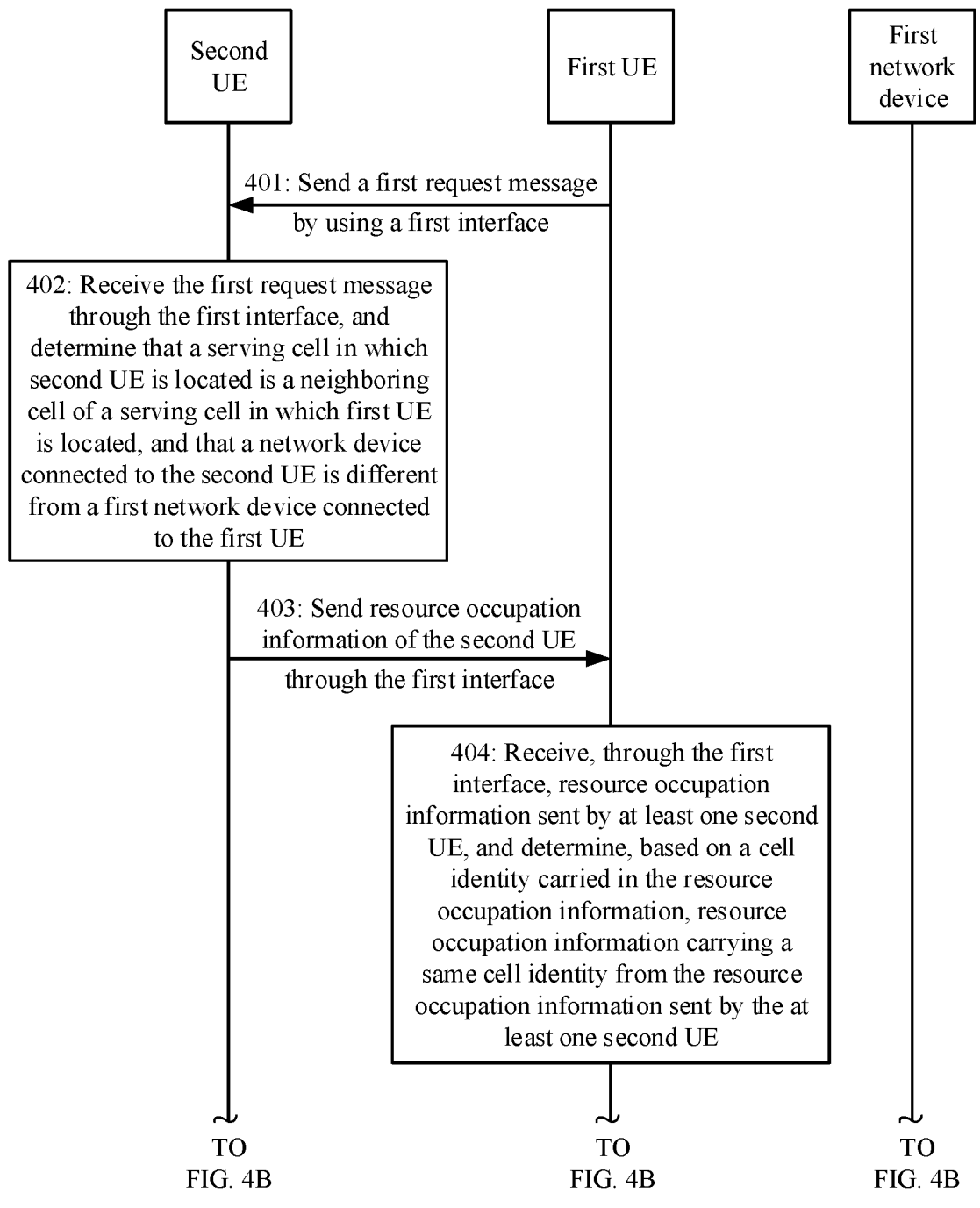
FIG. 4A & FIG. 4B are schematic flowcharts of still another resource allocation method according to an embodiment of the present invention.
Figure 4B:
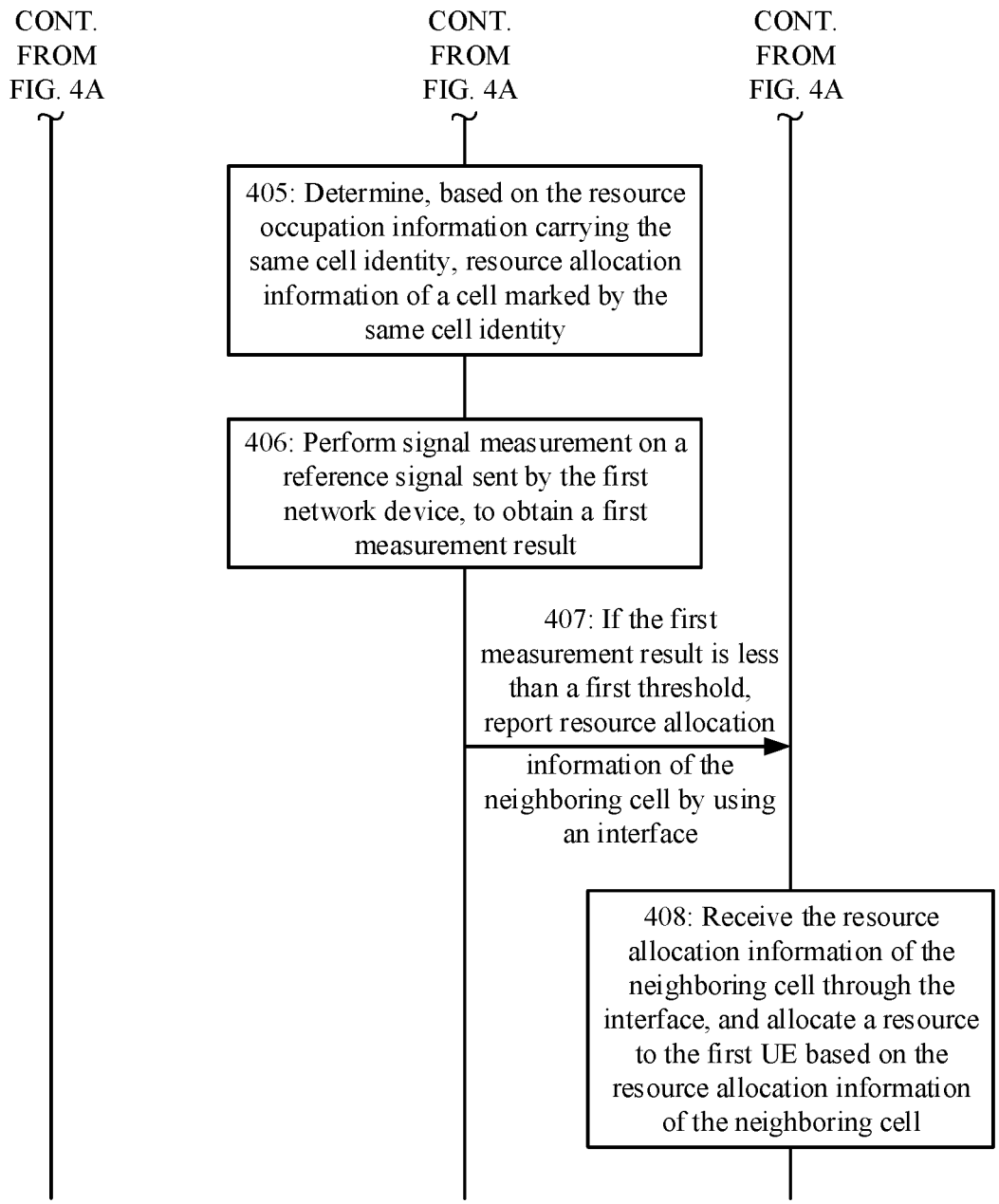

Based on the network architecture shown in FIG. 1, an embodiment of the present invention discloses still another resource allocation method. FIG. 4 is a schematic flowchart of still another resource allocation method according to an embodiment of the present invention. As shown in FIG. 4, the resource allocation method may include the following steps.

401: First UE sends a first request message through a first interface.

In this embodiment of the present invention, when the first UE needs to send uplink data, the first UE needs to request an uplink resource from a first network device connected to the first UE. That is, the first UE sends a BSR to the first network device. The BSR includes related information such as a size of the uplink data of the first UE. Before sending the BSR to the first network device, the first UE may first broadcast the first request message by using the first interface, or send the first request message to nearby UE through the first interface. The first request message may carry a cell identity of a serving cell in which the first UE is located, and an identifier of the first network device connected to the first UE, and is used to request to obtain resource occupation information of UE in a neighboring cell of the serving cell in which the first UE is located.

Optionally, the first network device may further send, to the first UE, a request message for obtaining resource allocation information of the neighboring cell of the serving cell in which the first UE is located. After receiving the request message, the first UE sends the first request message through the first interface. Optionally, a condition for triggering the first network device to send the request message to the first UE may be a condition for triggering the first network device to send resource allocation information request information to the second network device in the foregoing embodiment.

402: Second UE receives the first request message through the first interface, and determines that a serving cell in which the second UE is located is a neighboring cell of a serving cell in which the first UE is located, and that a network device connected to the second UE is different from a first network device connected to the first UE.

In this embodiment of the present invention, assuming that the second UE receives, through the first interface, the first request message sent by the first UE, after receiving the first request message, the second UE may determine, based on the cell identity carried in the first request message, whether the serving cell in which the second UE is located is the neighboring cell of the serving cell in which the first UE is located; and determine, based on the carried identifier of the first network device, whether the network device connected to the second UE and the first network device are a same network device.

If the second UE determines that the serving cell in which the second UE is located is the neighboring cell of the serving cell in which the first UE is located, and the network device connected to the second UE is different from the first network device, the second UE sends resource occupation information of the second UE to the first UE gthrough the first interface; or if the second UE determines that the serving cell in which the second UE is located and the serving cell in which the first UE is located are a same cell, or the network device connected to the second UE and the first network device are a same network device, the second UE may ignore the first request message.

403: The second UE sends resource occupation information of the second UE to the first UE through the first interface.

Optionally, if the second UE determines that the serving cell in which the second UE is located is the neighboring cell of the serving cell in which the first UE is located, and the network device connected to the second UE is different from the first network device, the second UE may further perform signal measurement on a reference signal sent by the network device connected to the second UE, to obtain a second measurement result. If determining that the second measurement result is less than a second threshold, the second UE sends the resource occupation information of the second UE to the first UE through the first interface.

It should be noted that the second threshold is a critical value for determining whether the second UE is located at a network coverage edge of the network device connected to the second UE, and may be the same as or different from a first threshold. The second threshold is configured and sent to the second UE by the network device connected to the second UE. In other words, if the second UE determines that the serving cell in which the second UE is located is the neighboring cell of the serving cell in which the first UE is located, and the network device connected to the second UE is different from the first network device, the second UE may further determine whether the second UE is located at the network coverage edge of the network device connected to the second UE.

Optionally, the first request message sent by the first UE may further carry a first measurement result of the first UE. After receiving the first request message sent, the second UE may first determine whether the first measurement result is less than the first threshold. The first threshold may be configured and sent to the second UE by the first network device. This is not limited in this embodiment of the present invention. If the first measurement result is less than the first threshold, it indicates that the first UE is located at a network coverage edge of the first network device. Then the second UE sends the resource occupation information of the second UE to the first UE through the first interface.

404: The first UE receives, through the first interface, resource occupation information sent by at least one second UE, and determines, based on a cell identity carried in the resource occupation information sent by the at least one second UE, resource occupation information carrying a same cell identity from the resource occupation information.

In this embodiment of the present invention, the first UE may receive, through the first interface, resource occupation information of a plurality of second UEs that is sent by the second UEs. Each piece of resource occupation information carries a respective cell identity. Then the first UE may categorize, based on cell identities, resource occupation information having a same cell identity, to obtain resource occupation information carrying a same cell identity.

For example, it is assumed that the first UE receives resource occupation information a, b, c, d, and e respectively sent by five second UEs, and cell identities carried by the resource occupation information a, b, c, d, and e are A, B, B, C, and A respectively. Then, after receiving the resource occupation information, the first UE may determine that the resource occupation information a and e carry the cell identity A, and the resource occupation information b and c carry the cell identity B, and the resource occupation information d carries the cell identity C.

Optionally, the resource occupation information may further carry the second measurement result. The second measurement result is a measurement result obtained after the second UE performs signal measurement on the reference signal sent by the network device connected to the second UE. Then a specific manner of determining, by the first UE based on the cell identity carried in the resource occupation information, the first resource occupation information carrying the same cell identity from the resource occupation information may be: after receiving the resource occupation information sent by the second UE, first determining, by the first UE, whether the second measurement result is less than the second threshold; and if the second measurement result is less than the second threshold, determining, based on the cell identity, the resource occupation information carrying the same cell identity from the resource occupation information whose second measurement result is less than the second threshold. The second threshold may be configured and sent to the first UE by the network device connected to the second UE.

If the second measurement result is less than the second threshold, it indicates that the second UE is located at the network coverage edge of the network device connected to the second UE, and to some extent, it may indicate that uplink/downlink data transmission of the second UE interferes with uplink/downlink data transmission of the first UE. The resource allocation information of the neighboring cell that is sent by the first UE may be understood as including resource occupation information of UE located at a cell edge of the neighboring cell. Then, when the first network device allocates a resource to the first UE, interference to the neighboring cell or interference from the neighboring cell can be more effectively avoided.

Optionally, after receiving the resource occupation information sent by the second UE, the first UE may further measure a reference signal sent by the second UE, to obtain a third measurement result. The third measurement result may include but is not limited to sidelink reference signal received power (Sidelink RSRP, S-RSRP) and sidelink discovery reference signal received power (Sidelink Discovery RSRP, SD-RSRP). If the third measurement result is greater than a third threshold, it may indicate that the first UE is relatively close to the second UE; or if the third measurement result is less than a third threshold, the first UE is relatively far away from the second UE. Then the first UE may determine, based on the cell identity, the resource occupation information carrying the same cell identity from the resource occupation information that is sent by the at least one second UE and whose third measurement result is greater than the third threshold. The resource allocation information of the neighboring cell that is sent by the first UE may be understood as including resource occupation information of another UE that is in the neighboring cell and that is close to the first UE. Then, when the first network device allocates a resource to the first UE, interference to the neighboring cell or interference from the neighboring cell can be more effectively avoided.

It should be noted that UEs that communicate with each other on a first interface, such as a PC5 interface, may send data by using resources allocated by network devices respectively connected to the UEs, and the network devices need to exchange resources on the PC5 interface, to configure the UEs to receive data. Alternatively, the first UE uses a resource broadcast by a network device connected to the neighboring cell, so that network devices do not need to exchange resource information. Alternatively, all resources allocated by network devices to PC5 interfaces of UEs are the same. Alternatively, an unlicensed spectrum resource may be used for an interface between UEs, for example, an unlicensed spectrum is used in Bluetooth and Wi-Fi.

405: The first UE determines, based on the resource occupation information carrying the same cell identity, resource allocation information of a cell marked by the same cell identity.

In this embodiment of the present invention, the first UE may determine, based on the resource occupation information carrying the same cell identity that is determined in step 404, the resource allocation information of the cell marked by the same cell identity. In other words, resource occupation information carrying a cell identity forms resource allocation information of a cell marked by the cell identity.

Optionally, the second UE may further actively send the resource occupation information of the second UE, for example, periodically broadcast the resource occupation information of the second UE under control of a network device. The resource occupation information may carry a cell identity of the serving cell in which the second UE is located. After receiving the resource occupation information sent by the second UE, the first UE may select, based on the cell identity, the resource occupation information of the second UE in the neighboring cell of the serving cell in which the first UE is located. The resource occupation information may further carry the measurement result obtained after the second UE performs signal measurement on the reference signal sent by the network device connected to the second UE. In this way, the first UE may select, based on the measurement result, resource occupation information of second UE located at a coverage edge of the neighboring cell. Therefore, the first UE may determine resource allocation information of each neighboring cell based on the cell identity and the resource occupation information of the second UE.

406: The first UE performs signal measurement on a reference signal sent by the first network device, to obtain a first measurement result.

407: If the first measurement result is less than a first threshold, the first UE reports resource allocation information of the neighboring cell to the first network device by using an interface.

In this embodiment of the present invention, after the first UE performs signal measurement on the reference signal sent by the first network device, to obtain the first measurement result, the first UE may also determine whether the first measurement result is less than the first threshold. If the first measurement result is less than the first threshold, it indicates that the first UE is located at the network coverage edge of the first network device. In this case, the first UE reports the collected resource allocation information of the neighboring cell to the first network device by using the first interface or a second interface. The first threshold may be configured and sent to the first UE by the first network device.

Optionally, when determining that the first UE is located at the network coverage edge of the first network device, the first UE may then perform steps 401 to 405 to collect the resource allocation information of the neighboring cell, and report the resource allocation information to the first network device. This is not limited in this embodiment of the present invention.

Further, if the first UE needs to send the uplink data, the first UE may further report the obtained resource allocation information of the neighboring cell to the first network device together with the BSR of the first UE, so that the first network device allocates a proper resource to the first UE based on the resource allocation information of the neighboring cell, the size of the data that needs to be sent by the first UE, and the like.

Optionally, step 406 and step 407 may be optional steps. To be specific, when the two steps are not performed, after receiving resource occupation information sent by several second UEs, the first UE may send, to the first network device, the resource allocation information of the neighboring cell that is obtained after consolidation. Alternatively, the first UE may receive, within a specific time, resource occupation information sent by several second UEs, and then send, to the first network device, the resource allocation information of the neighboring cell that is obtained after consolidation.

408: The first network device receives the resource allocation information of the neighboring cell through the interface, and allocates a resource to the first UE.

It can be learned that, in the method shown in FIG. 4, the first UE may receive, through the PC5 interface, resource occupation information of UE that is near the first UE and that is located in the neighboring cell of the serving cell in which the first UE is located, determine the resource allocation information of each neighboring cell based on the resource occupation information of the second UE, and then report the resource allocation information to the first network device by using the interface. In this manner, the first network device may receive the resource allocation information of the neighboring cell that is collected by the first UE, and does not need to obtain the resource allocation information from another network device by using an X2 interface. This can reduce signaling overheads of the X2 interface to some extent. If the resource allocation information of the neighboring cell is obtained in this manner when a system network is congested, efficiency for allocating a resource to UE can be further improved.

Figure 5A:
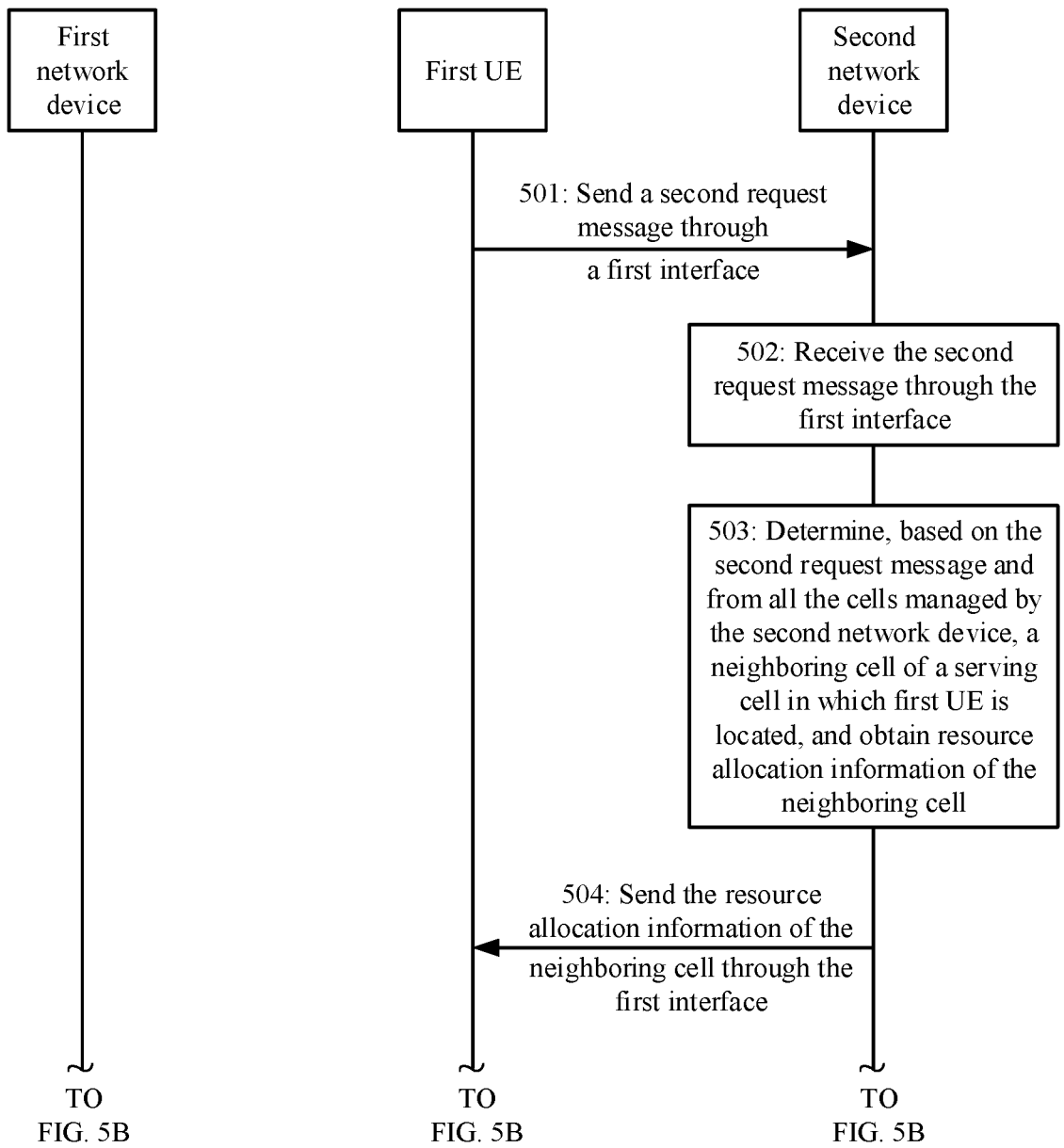
FIG. 5A & FIG. 5B are schematic flowcharts of still another resource allocation method according to an embodiment of the present invention.
Figure 5B:
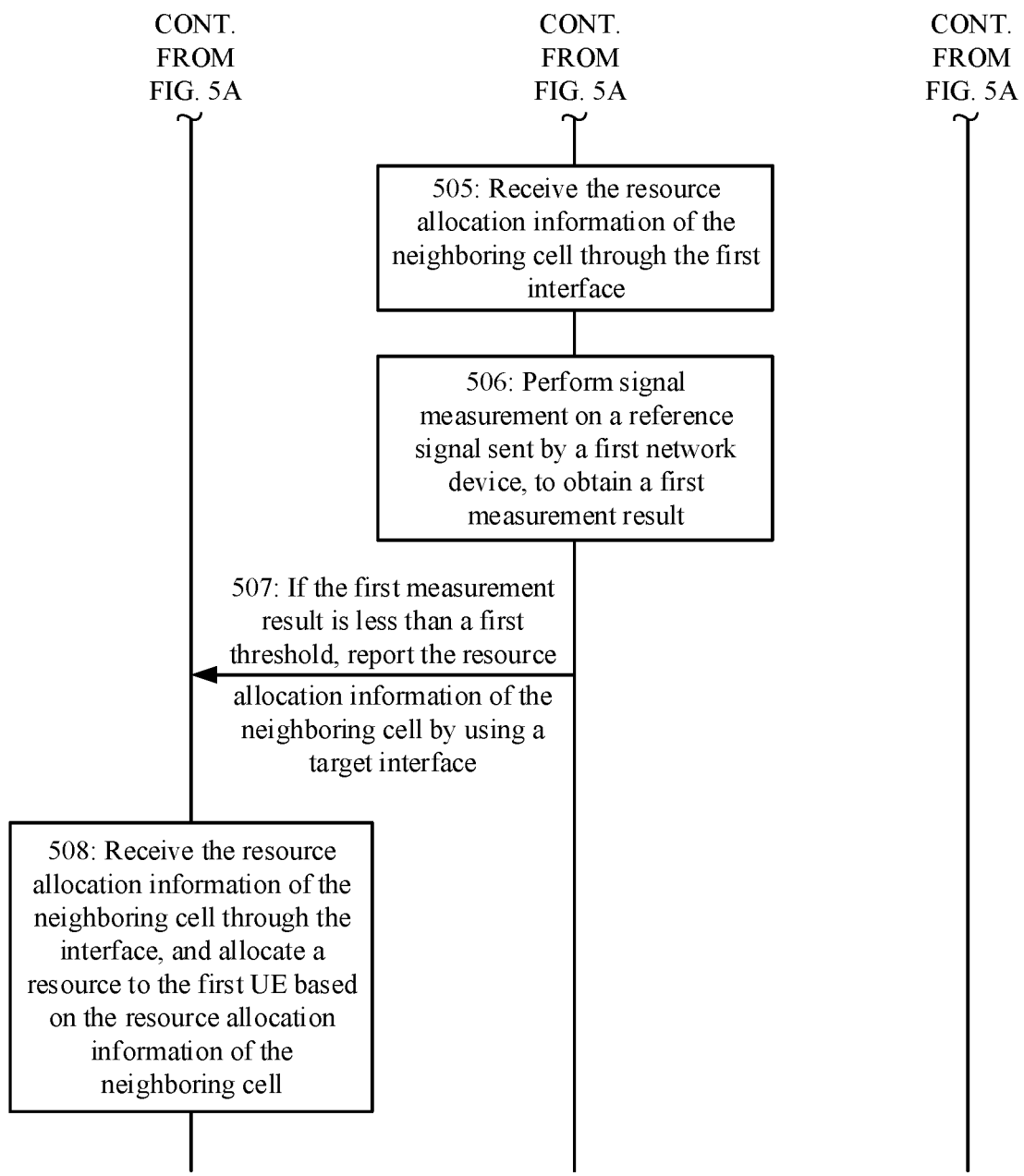

Based on the network architecture shown in FIG. 1, an embodiment of the present invention discloses still another resource allocation method. FIG. 5 is a schematic flowchart of still another resource allocation method according to an embodiment of the present invention. As shown in FIG. 5, the resource allocation method may include the following steps.

501: First UE sends a second request message to a second network device through a first interface.

In this embodiment of the present invention, the second network device may be understood as a network device to which a neighboring cell of a serving cell in which the first UE is located belongs. The first UE may establish a connection to the second network device by using the first interface. Then, if the first UE needs to obtain resource allocation information of the neighboring cell, the first UE may send the second request message to the second network device through the first interface. The second request message carries a cell identity of the serving cell in which the first UE is located, and is used to request to obtain the resource allocation information of the neighboring cell of the serving cell.

It should be noted that there may be one or more second network devices. The second network device may be the network device connected to the second UE in the foregoing embodiment. This is not limited in this embodiment of the present invention.

502: The second network device receives the second request message through the first interface.

503: The second network device determines, based on the second request message and from all the cells managed by the second network device, a neighboring cell of a serving cell in which the first UE is located, and obtains resource allocation information of the neighboring cell.

In this embodiment of the present invention, after receiving the second request message, the second network device may determine, based on the cell identity carried in the second request message, from all the cells managed by the second network device, the neighboring cell of the serving cell in which the first UE is located, so as to obtain the resource allocation information of the neighboring cell.

504: The second network device sends the resource allocation information of the neighboring cell to the first UE through the first interface.

In this embodiment of the present invention, after obtaining the resource allocation information of the neighboring cell, the second network device may send the resource allocation information of the neighboring cell to the first UE through the first interface.

Optionally, the second network device may further send, to the first UE through the first interface or a second interface, resource allocation information of the cells managed by the second network device. The resource allocation information carries cell identities of the cells. After receiving the resource allocation information of the cells, the first UE may determine, based on the cell identities, the resource allocation information of the neighboring cell of the serving cell in which the first UE is located. The second network device may further periodically broadcast, by using the first interface or the second interface, the resource allocation information of the cells managed by the second network device.

505: The first UE receives, through the first interface, the resource allocation information of the neighboring cell that is sent by the second network device.

506: The first UE performs signal measurement on a reference signal sent by a first network device, to obtain a first measurement result.

507: If the first measurement result is less than a first threshold, the first UE reports the resource allocation information of the neighboring cell to the first network device by using an interface.

Optionally, step 506 and step 507 may be optional steps. To be specific, when the two steps are not performed, after receiving resource allocation information sent by several second network devices, the first UE may send, to the first network device, the resource allocation information of the neighboring cell that is obtained after consolidation. Alternatively, the first UE may receive, within a specific time, resource allocation information sent by several second network devices, and then send, to the first network device, the resource allocation information of the neighboring cell that is obtained after consolidation.

508: The first network device receives the resource allocation information of the neighboring cell through the interface, and allocates a resource to the first UE.

It can be learned that, in the method shown in FIG. 5, the first UE may further send, through a PC5 interface, a resource allocation information obtaining request to a network device to which the neighboring cell belongs, and the network device sends the resource allocation information of the neighboring cell to the first UE. Alternatively, the first UE may determine the resource allocation information of the neighboring cell from resource allocation information of each cell that is broadcast by each network device, and then report the resource allocation information to the first network device by using the interface. In this manner, the first network device may receive the resource allocation information of the neighboring cell that is collected by the first UE, and does not need to obtain the resource allocation information from another network device by using an X2 interface. This can reduce signaling overheads of the X2 interface to some extent. If the resource allocation information of the neighboring cell is obtained in this manner when a system network is congested, efficiency for allocating a resource to UE can be further improved.

Figure 6A:
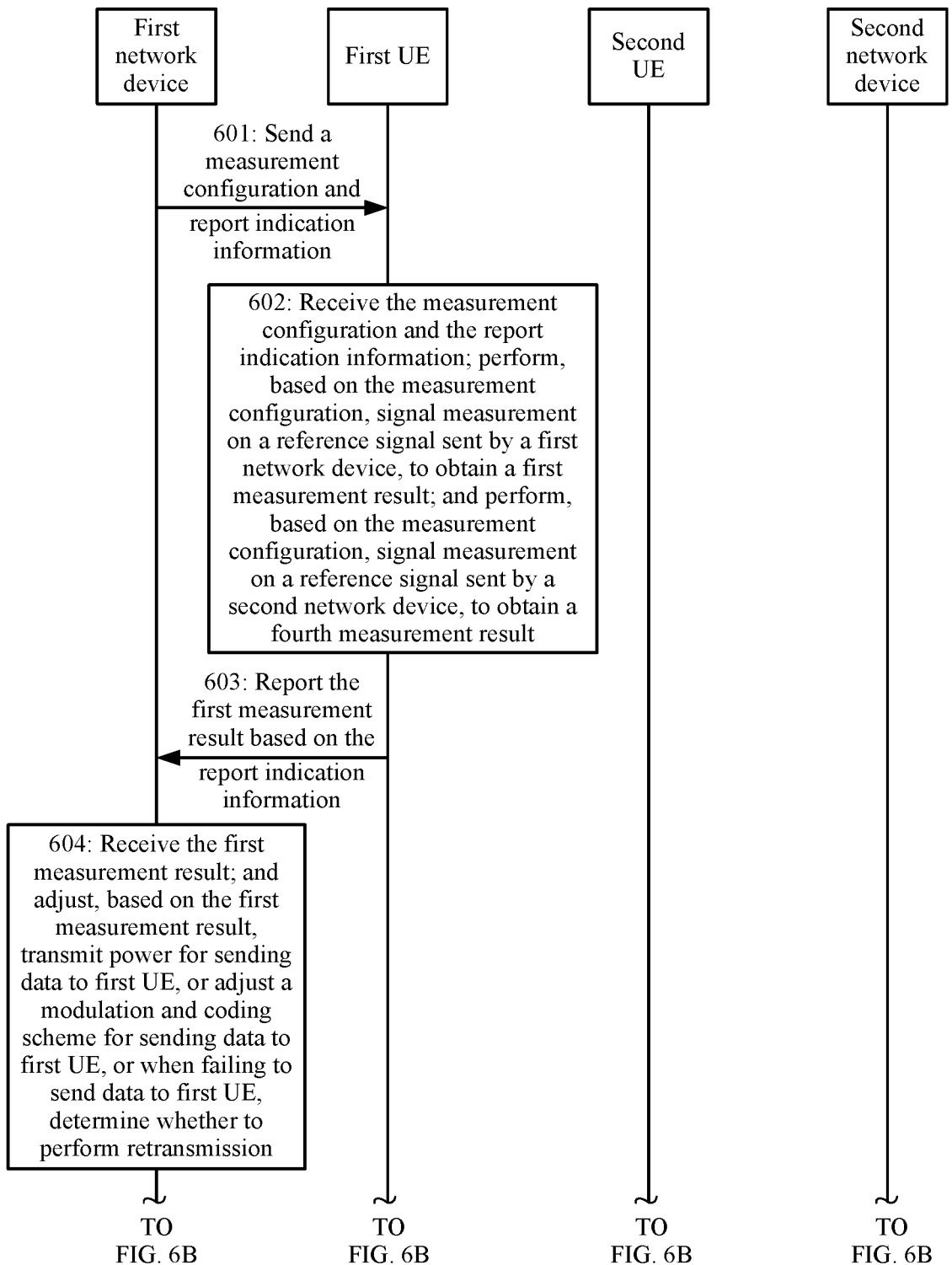
FIG. 6A & FIG. 6B are schematic flowcharts of cooperatively providing, by network devices, a downlink data transmission service for UE according to an embodiment of the present invention.
Figure 6B:
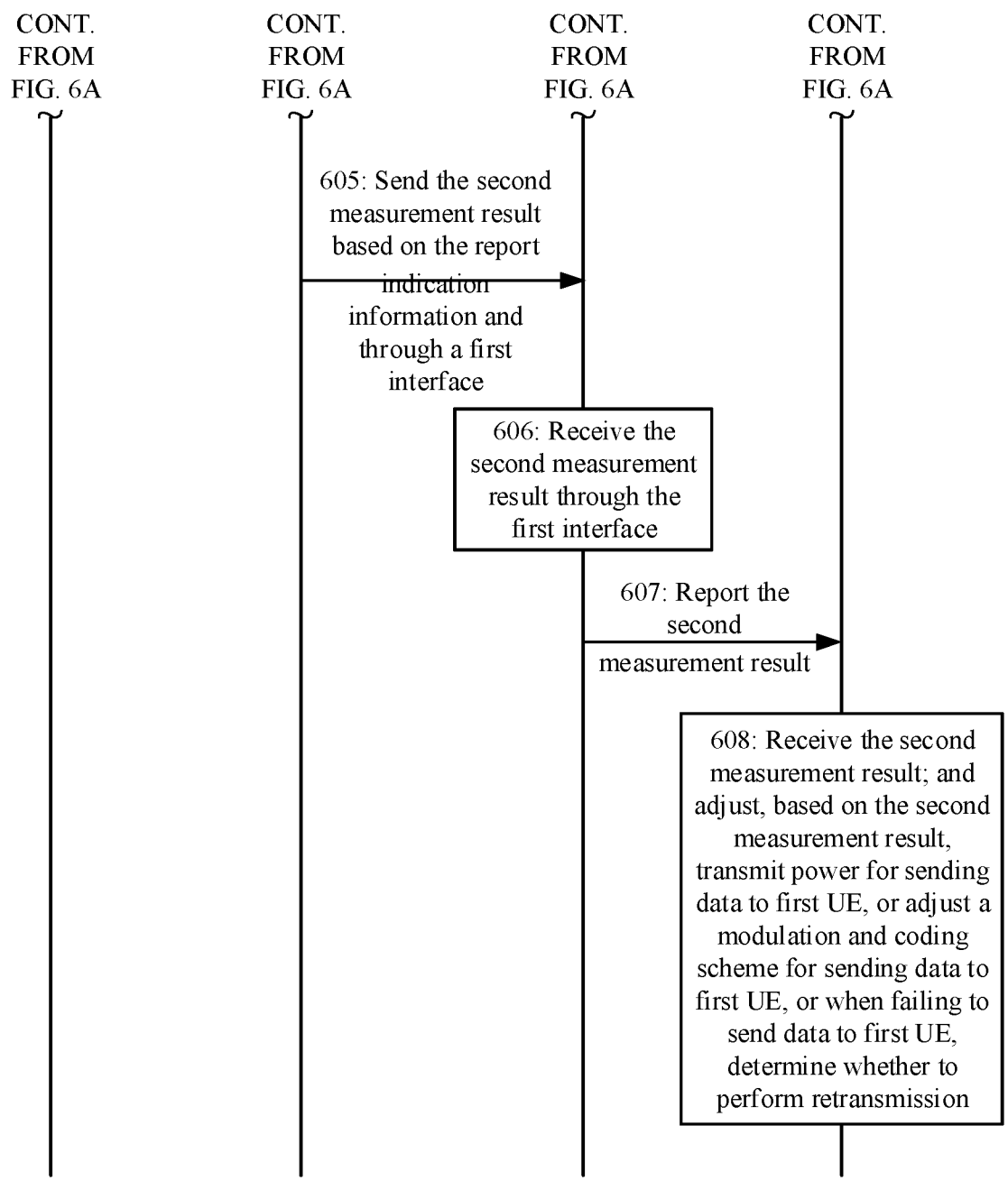

Based on the network architecture shown in FIG. 1, an embodiment of the present invention discloses a method for cooperatively providing, by network devices, a downlink data transmission service for UE. FIG. 6 is a schematic flowchart of cooperatively providing, by network devices, a downlink data transmission service for UE according to an embodiment of the present invention. As shown in FIG. 6, the method may include the following steps.

601: A first network device sends a measurement configuration and report indication information to first UE.

In this embodiment of the present invention, the first network device and a second network device may simultaneously provide a downlink data transmission service for the first UE. The first network device is a serving network device of the first UE. The second network device is an assistance transmission point of the first UE. The first network device and the second network device send downlink data to the first UE on a same resource.

Therefore, when detecting downlink data of the first UE, the first network device may send the measurement configuration and the report indication information to the first UE. The measurement configuration is used to instruct the first UE to measure at least one of RSRP, RSRQ, and an SINR of the first network device and the second network device. The report indication information is used to instruct the first UE to report, to the first network device and the second network device, information related to each of the first network device and the second network device.

602: The first UE receives the measurement configuration and the report indication information; performs, based on the measurement configuration, signal measurement on a reference signal sent by the first network device, to obtain a first measurement result; and performs, based on the measurement configuration, signal measurement on a reference signal sent by a second network device, to obtain a second measurement result.

In this embodiment of the present invention, after receiving the measurement configuration and the report indication information, the first UE may perform, based on the measurement configuration, signal measurement on the reference signal sent by the first network device, to obtain the first measurement result; and perform, based on the measurement configuration, signal measurement on the reference signal sent by the second network device, to obtain the second measurement result.

It should be noted that the first measurement result merely indicates a measurement result obtained after the first UE performs signal measurement on the reference signal sent by the first network device in this embodiment of the present invention, and the second measurement result merely indicates a measurement result obtained after the first UE performs signal measurement on the reference signal sent by the second network device in this embodiment of the present invention. A meaning of the second measurement result herein is different from a meaning of the second measurement result in the resource allocation method embodiment. Details are not described herein in this embodiment of the present invention.

603: The first UE reports the first measurement result to the first network device based on the report indication information.

In this embodiment of the present invention, the first UE may report the first measurement result to the first network device by using a first interface or a second interface. The first measurement result may include at least one of RSRP, RSRQ, and an SINR.

Optionally, the first UE may further report a CQI, a PMI, downlink data feedback information, and the like to the first network device together with the first measurement result.

604: The first network device receives the first measurement result; and adjusts, based on the first measurement result, transmit power for sending data to the first UE, or adjusts a modulation and coding scheme for sending data to the first UE, or when failing to send data to the first UE, determines whether to perform retransmission.

605: The first UE sends the second measurement result to second UE based on the report indication information and through a first interface.

In this embodiment of the present invention, the second measurement result may include at least one of RSRP, RSRQ, and an SINR. After performing signal measurement on the reference signal sent by the second network device, the first UE sends the second measurement result to the second UE through the first interface. The second UE is connected-state UE under the second network device.

606: The second UE receives, through the first interface, the second measurement result sent by the first UE.

Optionally, the first UE may further send a CQI, a PMI, downlink data feedback information, and the like to the second UE together with the second measurement result. The second UE reports the foregoing information to the second network device together with the second measurement result.

607: The second UE reports the second measurement result to the second network device.

In this embodiment of the present invention, the second UE may report the second measurement result to the second network device by using the first interface or the second interface.

608: The second network device receives the second measurement result; and adjusts, based on the second measurement result, transmit power for sending data to the first UE, or adjusts a modulation and coding scheme for sending data to the first UE, or when failing to send data to the first UE, determines whether to perform retransmission.

In this embodiment of the present invention, after receiving the second measurement result, the second network device may adjust, based on the second measurement result, the transmit power for sending the data to the first UE and determine whether to perform retransmission when failing to send the data to the first UE; or adjust a resource for sending the data to the first UE.

For example, when the second network device receives downlink transmission negative acknowledgement (Negative Acknowledgement, NACK) information fed back by the first UE, the second network device determines to retransmit a previously sent data packet. Alternatively, when the second measurement result fed back by the first UE and received by the second network device indicates that receive power of the first UE is excessively large, the transmit power may be reduced; or vice versa. Alternatively, the resource for sending the data to the first UE is adjusted based on the second measurement result.

Optionally, the first UE may directly report, to the second network device by using the first interface, information that needs to be reported to the second network device, without forwarding by the second UE. This can reduce an information transmission delay.

It can be learned that, in the method shown in FIG. 6, when the first network device and the second network device cooperatively provide the downlink data transmission service for the first UE, the measurement result obtained after the first UE measures the reference signal sent by the second network device may be forwarded to the second network device by using the second UE under the second network device. This can prevent the first network device from forwarding the measurement result of the first UE to the second network device by using an X2 interface, can reduce signaling overheads of the X2 interface, and can further reduce a communication delay between network devices when a system network is congested.

Figure 7:
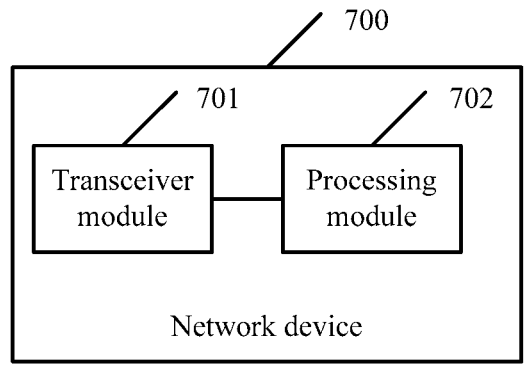
FIG. 7 is a schematic structural diagram of a network device according to an embodiment of the present invention.

Based on the network architecture shown in FIG. 1, an embodiment of the present invention discloses a network device. FIG. 7 is a schematic structural diagram of a network device according to an embodiment of the present invention. The network device 700 shown in FIG. 7 may be applied to the method embodiments shown in FIG. 2 to FIG. 5, to perform the operations performed by the first network device. As shown in FIG. 7, the network device 700 may include a transceiver module 701 and a processing module 702.

The transceiver module 701 is configured to receive, through an interface, resource allocation information of a neighboring cell of a serving cell in which first UE is located. A network device to which the neighboring cell belongs is different from the network device 700. The interface may include a first interface or a second interface. The first interface is an interface that performs communication by using a UE-to-UE communications technology, such as a PC5 interface, an interface between devices paired through Bluetooth, or an interface between devices connected through Wi-Fi. The second interface is an interface that performs communication by using a UE-to-network device communications technology, such as a Uu interface.

The processing module 702 is configured to allocate a resource to the first UE based on the resource allocation information of the neighboring cell.

Specifically, the processing module 702 allocates the resource to the first UE with reference to the resource allocation information of the neighboring cell, so as to avoid a conflict with a resource of nearby UE connected to another network device, and avoid interference to the network device 700 in receiving uplink data of the first UE, or avoid interference to another UE in the neighboring cell of the serving cell in which the first UE is located in receiving downlink data.

Optionally, the transceiver module 701 may be further configured to: receive, through the interface, a first measurement result reported by the first UE; and if the first measurement result is less than a threshold, receive, through the interface, the resource allocation information of the neighboring cell of the serving cell in which the first UE is located. The first measurement result is a measurement result obtained after the first UE performs signal measurement on a reference signal sent by the network device 700.

The first measurement result may include but is not limited to at least one of an SINR, RSRP, and RSRQ.

In this manner, the network device 700 obtains, only when allocating a resource to UE at a network edge, resource allocation information of a neighboring cell of a serving cell in which the UE is located. This can improve efficiency for allocating a resource to UE that is not at a network edge.

Specifically, a specific manner of receiving, by the transceiver module 701 through the interface, the resource allocation information of the neighboring cell of the serving cell in which the first UE is located may be:

sending a request message through the first interface, where the request message is used to request to obtain the resource allocation information of the neighboring cell of the serving cell in which the first UE is located, and the request message may further carry a cell identity of the serving cell in which the first UE is located; and receiving, through the first interface, the resource allocation information of the neighboring cell that is fed back by a second network device according to the request message, where the second network device is the network device to which the neighboring cell belongs.

Optionally, a specific manner of receiving, by the transceiver module 701 through the interface, the resource allocation information of the neighboring cell of the serving cell in which the first UE is located may alternatively be:

receiving, through the first interface, resource allocation information, sent by a second network device, of each cell managed by the second network device; and triggering the processing module 702 to determine, from the resource allocation information of each cell, the resource allocation information of the neighboring cell of the serving cell in which the first UE is located.

Optionally, a specific manner of receiving, by the transceiver module 701 through the interface, the resource allocation information of the neighboring cell of the serving cell in which the first UE is located may alternatively be:

receiving, through the first interface or the second interface, the resource allocation information, reported by the first UE, of the neighboring cell of the serving cell in which the first UE is located.

Optionally, the transceiver module 701 receives, through the first interface, resource allocation information, sent by UEs served by neighboring cells of the cell provided by the network device 700, of the neighboring cells. The resource allocation information carries cell identities of serving cells in which the UEs are located. The processing module 702 may determine the neighboring cell of the serving cell of the first UE based on the foregoing cell identities and the cell identity of the serving cell in which the first UE is located, and further determine the resource allocation information of the neighboring cell of the serving cell of the first UE.

Figure 8:
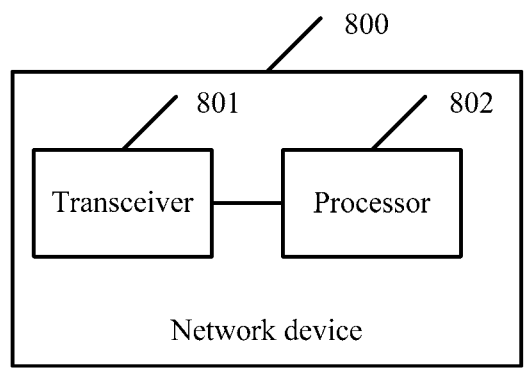
FIG. 8 is a schematic structural diagram of another network device according to an embodiment of the present invention.

FIG. 8 is a schematic structural diagram of another network device according to an embodiment of the present invention. The network device 800 shown in FIG. 8 may be applied to the method embodiments shown in FIG. 2 to FIG. 5, to perform the operations performed by the first network device. As shown in FIG. 8, the network device may include a transceiver 801 and a processor 802.

The transceiver 801 is configured to receive, through an interface, resource allocation information of a neighboring cell of a serving cell in which first UE is located. A network device to which the neighboring cell belongs is different from the network device 800. The interface may include a first interface or a second interface. The first interface is an interface that performs communication by using a UE-to-UE communications technology, such as a PC5 interface, an interface between devices paired through Bluetooth, or an interface between devices connected through Wi-Fi. The second interface is an interface that performs communication by using a UE-to-network device communications technology, such as a Uu interface.

The processor 802 is configured to allocate a resource to the first UE based on the resource allocation information of the neighboring cell.

Specifically, the processor 802 allocates the resource to the first UE with reference to the resource allocation information of the neighboring cell, so as to avoid a conflict with a resource of nearby UE connected to another network device, and avoid interference to the network device 800 in receiving uplink data of the first UE, or avoid interference to another UE in the neighboring cell of the serving cell in which the first UE is located in receiving downlink data.

Optionally, the transceiver 801 may be further configured to: receive, through the interface, a first measurement result reported by the first UE; and if the first measurement result is less than a threshold, receive, through the interface, the resource allocation information of the neighboring cell of the serving cell in which the first UE is located. The first measurement result is a measurement result obtained after the first UE performs signal measurement on a reference signal sent by the network device 800.

The first measurement result may include but is not limited to at least one of an SINR, RSRP, and RSRQ.

In this manner, the network device 800 obtains, only when allocating a resource to UE at a network edge, resource allocation information of a neighboring cell of a serving cell in which the UE is located. This can improve efficiency for allocating a resource to UE that is not at a network edge.

Specifically, a specific manner of receiving, by the transceiver 801 through the interface, the resource allocation information of the neighboring cell of the serving cell in which the first UE is located may be:

sending a request message through the first interface, where the request message is used to request to obtain the resource allocation information of the neighboring cell of the serving cell in which the first UE is located, and the request message may further carry a cell identity of the serving cell in which the first UE is located; and receiving, through the first interface, the resource allocation information of the neighboring cell that is fed back by a second network device according to the request message, where the second network device is the network device to which the neighboring cell belongs.

Optionally, a specific manner of receiving, by the transceiver 801 through the interface, the resource allocation information of the neighboring cell of the serving cell in which the first UE is located may alternatively be:

receiving, through the first interface, resource allocation information, sent by a second network device, of each cell managed by the second network device; and triggering the processor 802 to determine, from the resource allocation information of each cell, the resource allocation information of the neighboring cell of the serving cell in which the first UE is located.

Optionally, a specific manner of receiving, by the transceiver 801 through the interface, the resource allocation information of the neighboring cell of the serving cell in which the first UE is located may alternatively be:

receiving, through the first interface or the second interface, the resource allocation information, reported by the first UE, of the neighboring cell of the serving cell in which the first UE is located.

Optionally, the transceiver 801 receives, through the first interface, resource allocation information, sent by UEs served by neighboring cells of the cell provided by the network device 800, of the neighboring cells. The resource allocation information carries cell identities of serving cells in which the UEs are located. The processor 802 may determine the neighboring cell of the serving cell of the first UE based on the foregoing cell identities and the cell identity of the serving cell in which the first UE is located, and further determine the resource allocation information of the neighboring cell of the serving cell of the first UE.

It can be learned that, according to the network device shown in FIG. 7 or FIG. 8, the network device may receive, through the PC5 interface or the Uu interface, the resource allocation information, reported by the first UE, of the neighboring cell of the serving cell in which the first UE is located; or may receive, through the PC5 interface, the resource allocation information, sent by the another network device, of the neighboring cell of the serving cell in which the first UE is located, so that the network device may allocate the resource to the first UE based on the resource allocation information of the neighboring cell, so as to prevent the first UE from using a same resource as UE located in the neighboring cell, and reduce interference to the neighboring cell; or may allocate, to the first UE, a resource with relatively small interference to the UE, so as to reduce interference of the neighboring cell to the first UE. In this manner, signaling overheads of an X2 interface between network devices can be reduced, and efficiency for allocating a resource to UE can be further improved when a system network is relatively congested, so that a data transmission delay of UE can be reduced to some extent.

Figure 9:
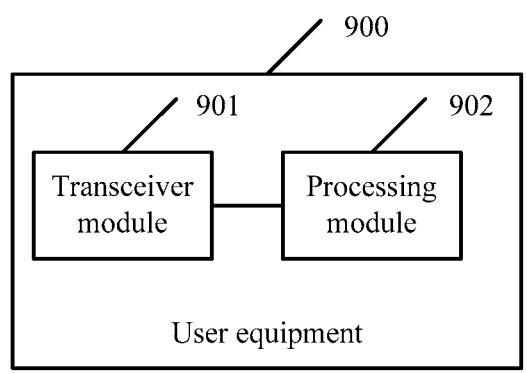
FIG. 9 is a schematic structural diagram of user equipment according to an embodiment of the present invention.

Based on the network architecture shown in FIG. 1, an embodiment of the present invention discloses user equipment. FIG. 9 is a schematic structural diagram of user equipment according to an embodiment of the present invention. The user equipment UE 900 shown in FIG. 9 may be applied to the method embodiments shown in FIG. 2 to FIG. 5, to perform the operations performed by the first UE. As shown in FIG. 9, the UE 900 may include a transceiver module 901 and a processing module 902.

The transceiver module 901 is configured to receive resource allocation information of a neighboring cell of a serving cell in which the UE 900 is located. A network device to which the neighboring cell belongs is different from a first network device connected to the UE 900.

The transceiver module 901 is further configured to report the resource allocation information of the neighboring cell to the first network device by using an interface. The resource allocation information of the neighboring cell is used by the first network device to allocate a resource to the UE 900. The interface includes a first interface or a second interface. The first interface is an interface that performs communication by using a UE-to-UE communications technology, such as a PC5 interface, an interface between devices paired through Bluetooth, or an interface between devices connected through Wi-Fi. The second interface is an interface that performs communication by using a UE-to-network device communications technology, such as a Uu interface.

It should be noted that the first network device mentioned in this embodiment of the present invention is the network device 700.

Optionally, the processing module 902 is configured to: perform signal measurement on a reference signal sent by the first network device, to obtain a first measurement result; and determine whether the first measurement result is less than a first threshold. If the first measurement result is less than the first threshold, the processing module 902 triggers the transceiver module 901 to report, by using the interface, the resource allocation information of the neighboring cell to the first network device.

In this manner, the UE 900 reports, to the first network device only when the UE 900 is located at a network edge of the first network device, the obtained resource allocation information of the neighboring cell of the serving cell in which the UE 900 is located, to request the first network device to allocate the resource to the UE 900. This can improve efficiency for allocating, by a network device, a resource to UE at a network edge.

Specifically, a specific manner of receiving, by the transceiver module 901, the resource allocation information of the neighboring cell of the serving cell in which the UE 900 is located may be:

receiving, through the first interface, resource occupation information that is sent by at least one second UE and that is of the second UE, where the resource occupation information is information about a resource allocated to the second UE by a network device connected to the second UE, the resource occupation information carries a cell identity of a serving cell in which the second UE is located, the serving cell in which the second UE is located is the neighboring cell of the serving cell in which the UE 900 is located, and the network device connected to the second UE and the first network device are different network devices; and triggering the processing module 902 to determine, based on the cell identity, resource occupation information carrying a same cell identity from the resource occupation information that is sent by the at least one second UE and that is of the second UE, and determine, based on the resource occupation information carrying the same cell identity, resource occupation information of a cell marked by the same cell identity.

Each UE may broadcast resource occupation information of the UE. After receiving resource occupation information broadcast by each UE in the neighboring cell, the UE 900 may determine resource occupation information of each neighboring cell based on a cell identity carried in the resource occupation information, and then report the obtained resource allocation information to the first network device. This can prevent network devices from exchanging resource allocation information by using an X2 interface, and can reduce signaling overheads of the X2 interface.

Optionally, the transceiver module 901 may be further configured to: before receiving, through the first interface, the resource occupation information that is sent by the at least one second UE and that is of the second UE, send a first request message through the first interface. The first request message is used to request to obtain resource occupation information of UE in the neighboring cell of the serving cell in which the UE 900 is located. The first request message carries a cell identity of the serving cell in which the UE 900 is located.

The UE 900 may send a request to nearby UE, to obtain resource occupation information of each UE in the neighboring cell and obtain resource allocation information of the neighboring cell; and then report the obtained resource allocation information to the first network device. This can prevent network devices from exchanging resource allocation information by using an X2 interface, and can reduce signaling overheads of the X2 interface.

Optionally, the first network device may further send, to the UE 900, a request message for obtaining the resource allocation information of the neighboring cell of the serving cell of the UE 900. After receiving the request message, the UE 900 sends the first request message through the first interface. Optionally, a condition for triggering the first network device to send the request message to the UE 900 may be a condition for triggering the first network device to send resource allocation information request information to a second network device.

Optionally, a specific manner of receiving, by the transceiver module 901, the resource allocation information of the neighboring cell of the serving cell in which the UE 900 is located may alternatively be:

sending a second request message to the second network device through the first interface, where the second network device is the network device to which the neighboring cell of the serving cell in which the UE 900 is located belongs, and the second request message is used to request to obtain the resource allocation information of the neighboring cell; and receiving, through the first interface, the resource allocation information of the neighboring cell that is sent by the second network device according to the second request message.

The UE 900 may send, through the PC5 interface, a request to the network device to which the neighboring cell belongs, to obtain the resource allocation information of the neighboring cell. This can prevent network devices from exchanging resource allocation information by using an X2 interface, and can reduce signaling overheads of the X2 interface.

Optionally, a specific manner of receiving, by the transceiver module 901, the resource allocation information of the neighboring cell of the serving cell in which the UE 900 is located may alternatively be:

receiving, through the first interface or the second interface, resource allocation information, sent by the second network device, of each cell managed by the second network device; and triggering the processing module 902 to determine, from the resource allocation information of each cell, the resource allocation information of the neighboring cell of the serving cell in which the UE 900 is located, where the second network device is the network device to which the neighboring cell belongs.

A network device may broadcast, to UE by using the first interface or the second interface, resource allocation information of each cell managed by the network device. After receiving the resource allocation information of each cell, the UE 900 may determine, from the resource allocation information of each cell, the resource allocation information of the neighboring cell of the serving cell in which the UE 900 is located; and report the resource allocation information to the first network device. This can prevent network devices from exchanging resource allocation information by using an X2 interface, and can reduce signaling overheads of the X2 interface.

Specifically, a specific manner of determining, by the processing module 902 based on the cell identity, the resource occupation information carrying the same cell identity from the resource occupation information that is sent by the at least one second UE and that is of the second UE may be:

if the resource occupation information further carries a second measurement result, determining, based on the cell identity, the resource occupation information carrying the same cell identity from the resource occupation information that is sent by the at least one second UE and that is of the second UE and whose second measurement result is less than a second threshold, where the second measurement result is a measurement result obtained after the second UE performs signal measurement on a reference signal sent by the network device connected to the second UE; or performing signal measurement on a reference signal sent by the second UE, to obtain a third measurement result, and determining, based on the cell identity, the resource occupation information carrying the same cell identity from the resource occupation information that is sent by the at least one second UE and that is of the second UE and whose third measurement result is greater than a third threshold.

The UE 900 may determine resource occupation information of UEs at an edge of the neighboring cell, and because the UE 900 can receive the resource occupation information sent by the UEs, the UE 900 may determine that the UEs are located at the edge of the neighboring cell and are relatively close to the UE 900. Usually, UE at a coverage edge of a cell performs uplink transmission by using relatively large power, thereby causing relatively large interference to a neighboring cell. In addition, a base station sends a downlink signal to edge UE also by using relatively large power, thereby causing relatively large interference to edge UE in a neighboring cell. If the UE 900 reports the resource occupation information of the UEs to the first network device, when the first network device allocates the resource to the UE 900, a conflict with a resource occupied by the UEs can be avoided, thereby reducing interference to the UE 900 and the UEs.

In this manner, the UE 900 determines the resource allocation information of the neighboring cell based on the resource occupation information of the UEs that are relatively close. This can improve accuracy for obtaining the resource allocation information of the neighboring cell. Therefore, when the first network device allocates the resource to the UE 900, impact on data transmission of UE at a network coverage edge of the neighboring cell can be more effectively avoided, or the UE 900 can be prevented from being affected by UE at a network coverage edge of the neighboring cell.

It should be noted that, the first measurement result mentioned in this embodiment of the present invention is a measurement result obtained after the UE 900 performs signal measurement on a reference signal sent by the first network device, the second measurement result is the measurement result obtained after the second UE performs signal measurement on the reference signal sent by the network device connected to the second UE, and the third measurement result is a measurement result obtained after the UE 900 performs signal measurement on a reference signal sent by the second UE. The foregoing measurement results may include but are not limited to at least one of an SINR, RSRP, and RSRQ. The first threshold, the second threshed, and the third threshold may be the same, or may be different. This is not limited in this embodiment of the present invention.

Figure 10:
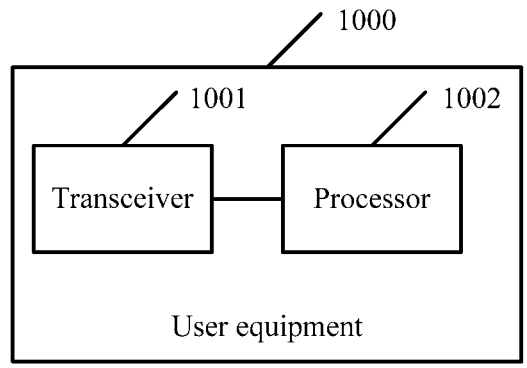
FIG. 10 is a schematic structural diagram of another user equipment according to an embodiment of the present invention.

FIG. 10 is a schematic structural diagram of another user equipment according to an embodiment of the present invention. The UE 1000 shown in FIG. 10 may be applied to the method embodiments shown in FIG. 2 to FIG. 5, to perform the operations performed by the first UE. As shown in FIG. 10, the UE 100 may include a transceiver 1001 and a processor 1002.

The transceiver 1001 is configured to receive resource allocation information of a neighboring cell of a serving cell in which the UE 1000 is located. A network device to which the neighboring cell belongs is different from a first network device connected to the UE 1000.

The transceiver 1001 is further configured to report the resource allocation information of the neighboring cell to the first network device by using an interface. The resource allocation information of the neighboring cell is used by the first network device to allocate a resource to the UE 900. The interface includes a first interface or a second interface. The first interface is an interface that performs communication by using a UE-to-UE communications technology, such as a PC5 interface, an interface between devices paired through Bluetooth, or an interface between devices connected through Wi-Fi. The second interface is an interface that performs communication by using a UE-to-network device communications technology, such as a Uu interface.

It should be noted that the first network device mentioned in this embodiment of the present invention is the network device 800.

Optionally, the processor 1002 is configured to: perform signal measurement on a reference signal sent by the first network device, to obtain a first measurement result; and determine whether the first measurement result is less than a first threshold. If the first measurement result is less than the first threshold, the processing module 902 triggers the transceiver 1001 to report, by using the interface, the resource allocation information of the neighboring cell to the first network device.

In this manner, the UE 1000 reports, to the first network device only when the UE 1000 is located at a network edge of the first network device, the obtained resource allocation information of the neighboring cell of the serving cell in which the UE 1000 is located, to request the first network device to allocate the resource to the UE 1000. This can improve efficiency for allocating, by a network device, a resource to UE at a network edge.

Specifically, a specific manner of receiving, by the transceiver 1001, the resource allocation information of the neighboring cell of the serving cell in which the UE 1000 is located may be:

receiving, through the first interface, resource occupation information that is sent by at least one second UE and that is of the second UE, where the resource occupation information is information about a resource allocated to the second UE by a network device connected to the second UE, the resource occupation information carries a cell identity of a serving cell in which the second UE is located, the serving cell in which the second UE is located is the neighboring cell of the serving cell in which the UE 1000 is located, and the network device connected to the second UE and the first network device are different network devices; and triggering the processor 1002 to determine, based on the cell identity, resource occupation information carrying a same cell identity from the resource occupation information that is sent by the at least one second UE and that is of the second UE, and determine, based on the resource occupation information carrying the same cell identity, resource occupation information of a cell marked by the same cell identity.

Each UE may broadcast resource occupation information of the UE. After receiving resource occupation information broadcast by each UE in the neighboring cell, the UE 1000 may determine resource occupation information of each neighboring cell based on a cell identity carried in the resource occupation information, and then report the obtained resource occupation information to the first network device. This can prevent network devices from exchanging resource allocation information by using an X2 interface, and can reduce signaling overheads of the X2 interface.

Optionally, the transceiver 1001 may be further configured to: before receiving, through the first interface, the resource occupation information that is sent by the at least one second UE and that is of the second UE, send a first request message through the first interface. The first request message is used to request to obtain resource occupation information of UE in the neighboring cell of the serving cell in which the UE 1000 is located. The first request message carries a cell identity of the serving cell in which the UE 1000 is located.

The UE 1000 may send a request to nearby UE, to obtain resource occupation information of each UE in the neighboring cell and obtain resource allocation information of the neighboring cell; and then report the obtained resource allocation information to the first network device. This can prevent network devices from exchanging resource allocation information by using an X2 interface, and can reduce signaling overheads of the X2 interface.

Optionally, the first network device may further send, to the UE 900, a request message for obtaining the resource allocation information of the neighboring cell of the serving cell of the UE 900. After receiving the request message, the UE 900 sends the first request message through the first interface. Optionally, a condition for triggering the first network device to send the request message to the UE 900 may be a condition for triggering the first network device to send resource allocation information request information to a second network device.

Optionally, a specific manner of receiving, by the transceiver 1001, the resource allocation information of the neighboring cell of the serving cell in which the UE 1000 is located may alternatively be:

sending a second request message to the second network device through the first interface, where the second network device is the network device to which the neighboring cell of the serving cell in which the UE 900 is located belongs, and the second request message is used to request to obtain the resource allocation information of the neighboring cell; and receiving, through the first interface, the resource allocation information of the neighboring cell that is sent by the second network device according to the second request message.

The UE 1000 may send, through the PC5 interface, a request to the network device to which the neighboring cell belongs, to obtain the resource allocation information of the neighboring cell. This can prevent network devices from exchanging resource allocation information by using an X2 interface, and can reduce signaling overheads of the X2 interface.

Optionally, a specific manner of receiving, by the transceiver 1001, the resource allocation information of the neighboring cell of the serving cell in which the UE 1000 is located may alternatively be:

receiving, through the first interface or the second interface, resource allocation information, sent by the second network device, of each cell managed by the second network device; and triggering the processor 1002 to determine, from the resource allocation information of each cell, the resource allocation information of the neighboring cell of the serving cell in which the UE 1000 is located, where the second network device is the network device to which the neighboring cell belongs.

A network device may broadcast, to UE by using the first interface or the second interface, resource allocation information of each cell managed by the network device. After receiving the resource allocation information of each cell, the UE 1000 may determine, from the resource allocation information of each cell, the resource allocation information of the neighboring cell of the serving cell in which the UE 1000 is located; and report the resource allocation information to the first network device. This can prevent network devices from exchanging resource allocation information by using an X2 interface, and can reduce signaling overheads of the X2 interface.

Specifically, a specific manner of determining, by the processor 1002 based on the cell identity, the resource occupation information carrying the same cell identity from the resource occupation information that is sent by the at least one second UE and that is of the second UE may be:

if the resource occupation information further carries a second measurement result, determining, based on the cell identity, the resource occupation information carrying the same cell identity from the resource occupation information that is sent by the at least one second UE and that is of the second UE and whose second measurement result is less than a second threshold, where the second measurement result is a measurement result obtained after the second UE performs signal measurement on a reference signal sent by the network device connected to the second UE; or performing signal measurement on a reference signal sent by the second UE, to obtain a third measurement result, and determining, based on the cell identity, the resource occupation information carrying the same cell identity from the resource occupation information that is sent by the at least one second UE and that is of the second UE and whose third measurement result is greater than a third threshold.

The UE 1000 may determine resource occupation information of UEs at an edge of the neighboring cell, and because the UE 1000 can receive the resource occupation information sent by the UEs, the UE 1000 may determine that the UEs are located at the edge of the neighboring cell and are relatively close to the UE 1000. Usually, UE at a coverage edge of a cell performs uplink transmission by using relatively large power, thereby causing relatively large interference to a neighboring cell. In addition, a base station sends a downlink signal to edge UE also by using relatively large power, thereby causing relatively large interference to edge UE in a neighboring cell. If the UE 1000 reports the resource occupation information of the UEs to the first network device, when the first network device allocates the resource to the UE 1000, a conflict with a resource occupied by the UEs can be avoided, thereby reducing interference to the UE 1000 and the UEs.

The UE 1000 determines the resource allocation information of the neighboring cell based on the resource occupation information of the UEs that are relatively close. This can improve accuracy for obtaining the resource allocation information of the neighboring cell. Therefore, when the first network device allocates the resource to the UE 1000, impact on data transmission of UE at a network coverage edge of the neighboring cell can be more effectively avoided, or the UE 1000 can be prevented from being affected by UE at a network coverage edge of the neighboring cell.

It should be noted that, the first measurement result mentioned in this embodiment of the present invention is a measurement result obtained after the UE 1000 performs signal measurement on a reference signal sent by the first network device, the second measurement result is the measurement result obtained after the second UE performs signal measurement on the reference signal sent by the network device connected to the second UE, and the third measurement result is a measurement result obtained after the UE 1000 performs signal measurement on a reference signal sent by the second UE. The foregoing measurement results may include but are not limited to at least one of an SINR, RSRP, and RSRQ. The first threshold, the second threshed, and the third threshold may be the same, or may be different. This is not limited in this embodiment of the present invention.

It can be learned that, according to the user equipment shown in FIG. 9 or FIG. 10, the user equipment may receive, through the PC5 interface, resource occupation information of UE located in the neighboring cell, and determine the resource allocation information of the neighboring cell; or may obtain the resource allocation information of the neighboring cell from another network device by using the PC5 interface or the Uu interface, and report the resource allocation information to the first network device. This can prevent network devices from exchanging resource allocation information by using an X2 interface, can reduce signaling overheads of the X2 interface, and can improve efficiency for obtaining resource allocation information when a system network is congested.

Figure 11:
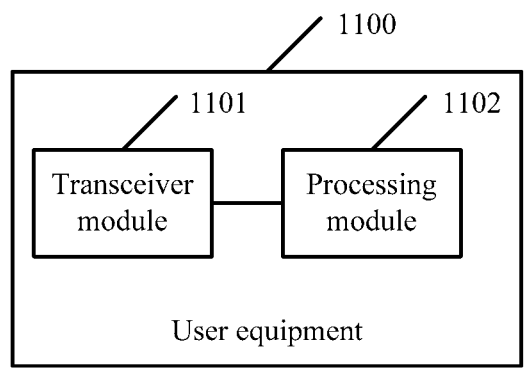
FIG. 11 is a schematic structural diagram of another user equipment according to an embodiment of the present invention.

Based on the network architecture shown in FIG. 1, an embodiment of the present invention discloses still another user equipment. FIG. 11 is a schematic structural diagram of still another user equipment according to an embodiment of the present invention. The UE 1100 shown in FIG. 11 may be applied to the method embodiments shown in FIG. 2 to FIG. 5, to perform the operations performed by the second UE. As shown in FIG. 11, the UE 1100 may include a transceiver module 1101 and a processing module 1102.

The transceiver module 1101 is configured to receive, through a first interface, a first request message sent by first UE. The first request message is used to request to obtain resource occupation information of UE in a neighboring cell of a serving cell in which the first UE is located. The first interface is an interface that performs communication by using a UE-to-UE communications technology, such as a PC5 interface, an interface between devices paired through Bluetooth, or an interface between devices connected through Wi-Fi. The first request message may include a cell identity of the serving cell in which the first UE is located, and an identifier of a first network device connected to the first UE.

The processing module 1102 is configured to: determine, based on the cell identity, that a serving cell in which the UE 1100 is located is the neighboring cell of the serving cell in which the first UE is located; and determine, based on the identifier of the first network device, that a network device connected to the UE 1100 is different from the first network device.

The transceiver module 1101 is configured to send resource occupation information of the UE 1100 to the first UE through the first interface.

Optionally, the processing module 1102 may be further configured to: perform signal measurement on a reference signal sent by the network device connected to the UE 1100, to obtain a second measurement result; and if the second measurement result is less than a second threshold, trigger the transceiver module 1101 to send the resource occupation information of the UE 1100 to the first UE through the first interface.

In this manner, after receiving the first request message sent by the first UE, the UE 1100 sends the resource occupation information of the UE 1100 to the first UE only when determining that the UE 1100 is located at a network coverage edge. This can improve accuracy for obtaining, by the first UE, resource allocation information, of the neighboring cell, about a resource that may interfere with the first UE. Therefore, when the first network device allocates a resource to the first UE, impact on data transmission of UE at a coverage edge of the neighboring cell can be more effectively avoided, or impact from UE at a coverage edge of the neighboring cell can be avoided.

Optionally, a specific manner of sending, by the transceiver module 1101, the resource occupation information of the UE 1100 to the first UE through the first interface may be:

if the first request message further includes a first measurement result obtained after the first UE performs signal measurement on a reference signal sent by the first network device, and the first measurement result is less than a first threshold, sending the resource occupation information of the UE 1100 to the first UE through the first interface.

When receiving the first request message, the UE 1100 may determine whether the first UE is located at a network coverage edge of the first network device. The UE 1100 sends the resource occupation information of the UE 1100 to the first UE only if the first UE is located at the network coverage edge of the first network device. This can avoid sending the resource occupation information of the UE 1100 to UE that is not at the network coverage edge of the first network device, and can avoid transmission of unnecessary information and reduce signaling overheads of the first interface.

Figure 12:
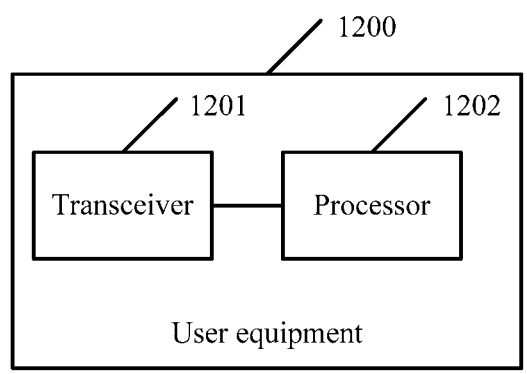
FIG. 12 is a schematic structural diagram of another user equipment according to an embodiment of the present invention.

FIG. 12 is a schematic structural diagram of still another user equipment according to an embodiment of the present invention. The UE 1200 shown in FIG. 12 may be applied to the method embodiments shown in FIG. 2 to FIG. 5, to perform the operations performed by the second UE. As shown in FIG. 12, the UE 1200 may include a transceiver 1201 and a processor 1202.

The transceiver 1201 is configured to receive, through a first interface, a first request message sent by first UE. The first request message is used to request to obtain resource occupation information of UE in a neighboring cell of a serving cell in which the first UE is located. The first interface is an interface that performs communication by using a UE-to-UE communications technology, such as a PC5 interface, an interface between devices paired through Bluetooth, or an interface between devices connected through Wi-Fi. The first request message may include a cell identity of the serving cell in which the first UE is located, and an identifier of a first network device connected to the first UE.

The processor 1202 is configured to: determine, based on the cell identity, that a serving cell in which the UE 1200 is located is the neighboring cell of the serving cell in which the first UE is located; and determine, based on the identifier of the first network device, that a network device connected to the UE 1200 is different from the first network device.

The transceiver 1201 is configured to send resource occupation information of the UE 1200 to the first UE through the first interface.

Optionally, the processor 1202 may be further configured to: perform signal measurement on a reference signal sent by the network device connected to the UE 1200, to obtain a second measurement result; and if the second measurement result is less than a second threshold, trigger the transceiver module 1101 to send the resource occupation information of the UE 1200 to the first UE through the first interface.

In this manner, after receiving the first request message sent by the first UE, the UE 1200 sends the resource occupation information of the UE 1200 to the first UE only when determining that the UE 1200 is located at a network coverage edge. This can improve accuracy for obtaining, by the first UE, resource allocation information, of the neighboring cell, about a resource that may interfere with the first UE. Therefore, when the first network device allocates a resource to the first UE, impact on data transmission of UE at a coverage edge of the neighboring cell can be more effectively avoided, or impact from UE at a coverage edge of the neighboring cell can be avoided.

Optionally, a specific manner of sending, by the transceiver 1201, the resource occupation information of the UE 1200 to the first UE through the first interface may be:

if the second request message further includes a first measurement result obtained after the first UE performs signal measurement on a reference signal sent by the first network device, and the first measurement result is less than a first threshold, sending the resource occupation information of the UE 1200 to the first UE through the first interface.

When receiving the first request message, the UE 1200 may determine whether the first UE is located at a network coverage edge of the first network device. The UE 1200 sends the resource occupation information of the UE 1200 to the first UE only if the first UE is located at the network coverage edge of the first network device. This can avoid sending the resource occupation information of the UE 1200 to UE that is not at the network coverage edge of the first network device, and can avoid transmission of unnecessary information and reduce signaling overheads of the first interface.

It can be learned that, according to the user equipment shown in FIG. 11 or FIG. 12, after receiving the request message that is sent by the first UE and that is used to obtain the resource occupation information of the UE in the neighboring cell, the UE in the neighboring cell sends the resource occupation information of the UE to the first UE through the PC5 interface. The first UE determines the resource allocation information of the neighboring cell based on the resource occupation information, so that the network device connected to the first UE may allocate the resource to the first UE based on the resource allocation information of the neighboring cell. This can more effectively avoid impact on data transmission of the UE in the neighboring cell, or avoid impact from the UE in the neighboring cell.

Figure 13:
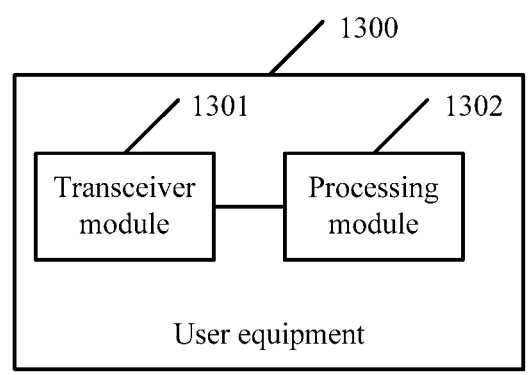
FIG. 13 is a schematic structural diagram of another user equipment according to an embodiment of the present invention.

Based on the network architecture shown in FIG. 1, an embodiment of the present invention discloses still another user equipment. FIG. 13 is a schematic structural diagram of still another user equipment according to an embodiment of the present invention. The UE 1300 shown in FIG. 13 may be applied to the method embodiment shown in FIG. 6, to perform the operations performed by the first UE. As shown in FIG. 13, the UE 1300 may include a transceiver module 1301 and a processing module 1302.

The transceiver module 1301 is configured to receive a measurement configuration and report indication information that are sent by a first network device.

The processing module 1302 is configured to: perform, based on the measurement configuration, signal measurement on a reference signal sent by the first network device, to obtain a first measurement result; and perform, based on the measurement configuration, signal measurement on a reference signal sent by a second network device, to obtain a second measurement result.

The transceiver module 1301 is further configured to report the first measurement result to the first network device based on the report indication information, so that the first network device adjusts, based on the first measurement result, transmit power for sending data to the UE 1300, or adjusts a modulation and coding scheme for sending data to the UE 1300, or when failing to send data to the UE 1300, determines whether to perform retransmission.

The transceiver module 1302 is further configured to send the second measurement result to second UE based on the report indication information and through a first interface. The second UE is connected-state UE under the second network device.

Therefore, after receiving the second measurement result, the second UE may report the second measurement result to the second network device, so that the second network device may adjust, based on the second measurement result, transmit power for sending data to the UE 1300, or when failing to send data to the UE 1300, determine whether to perform retransmission, or adjust a resource for sending data to the UE 1300, or adjust a modulation and coding scheme for sending data to the UE 1300.

Figure 14:
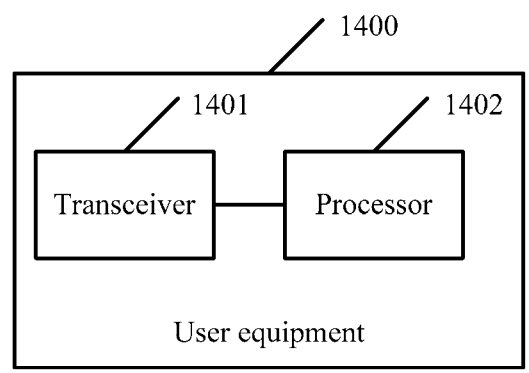
FIG. 14 is a schematic structural diagram of another user equipment according to an embodiment of the present invention.

FIG. 14 is a schematic structural diagram of still another user equipment according to an embodiment of the present invention. The UE 1400 shown in FIG. 14 may be applied to the method embodiment shown in FIG. 6, to perform the operations performed by the first UE. As shown in FIG. 14, the UE 1400 may include a transceiver 1401 and a processor 1402.

The transceiver 1401 is configured to receive a measurement configuration and report indication information that are sent by a first network device.

The processor 1402 is configured to: perform, based on the measurement configuration, signal measurement on a reference signal sent by the first network device, to obtain a first measurement result; and perform, based on the measurement configuration, signal measurement on a reference signal sent by a second network device, to obtain a second measurement result.

The transceiver 1401 is further configured to report the first measurement result to the first network device based on the report indication information, so that the first network device adjusts, based on the first measurement result, transmit power for sending data to the UE 1400, or adjusts a modulation and coding scheme for sending data to the UE 1400, or when failing to send data to the UE 1400, determines whether to perform retransmission.

The transceiver 1402 is further configured to send the second measurement result to second UE based on the report indication information and through a first interface. The second UE is connected-state UE under the second network device.

Therefore, after receiving the second measurement result, the second UE may report the second measurement result to the second network device, so that the second network device may adjust, based on the second measurement result, transmit power for sending data to the UE 1400, or when failing to send data to the UE 1400, determine whether to perform retransmission, or adjust a resource for sending data to the UE 1400, or adjust a modulation and coding scheme for sending data to the UE 1300.

It can be learned that, according to the user equipment shown in FIG. 13 or FIG. 14, when the first network device and the second network device cooperatively provide a downlink data transmission service for UE, a measurement result obtained after the UE measures a reference signal sent by the second network device may be forwarded to the second network device by using the second UE under the second network device. This can prevent the first network device from forwarding the measurement result of the UE to the second network device through an X2 interface, can reduce signaling overheads of the X2 interface, and can further reduce a communication delay between network devices when a system network is congested.

Figure 15:
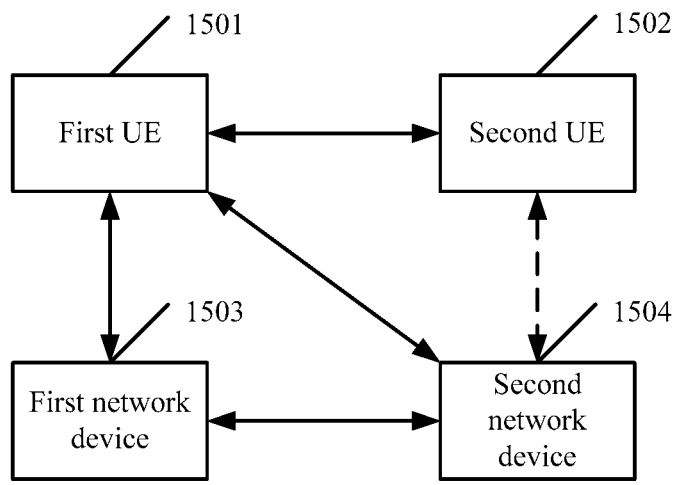
FIG. 15 is a schematic structural diagram of a resource allocation system according to an embodiment of the present invention.

Based on the network architecture shown in FIG. 1, an embodiment of the present invention discloses a resource allocation system. FIG. 15 is a schematic structural diagram of a resource allocation system according to an embodiment of the present invention. As shown in FIG. 15, the resource allocation system may include first UE 1501, second UE 1502, a first network device 1503, and a second network device 1504. The first UE 1501 is located at a network coverage edge of the first network device 1503. A serving cell in which the first UE 1501 is located and a serving cell in which the second UE 1502 is located are neighboring cells. The second UE 1502 may also be located at a coverage edge of a network device connected to the second UE 1502. The network device is different from the first network device 1503, and may be the second network device 1504, or may not be the second network device 1504. This is not limited in this embodiment of the present invention. The second network device 1504 is a network device to which a neighboring cell of the serving cell in which the first UE 1501 is located belongs.

The first UE 1501 sends, to the first network device 1503 through an interface, resource allocation information of the neighboring cell of the serving cell in which the first UE 1501 is located. The network device to which the neighboring cell belongs is different from the first network device 1503.

The first network device 1503 receives, through the interface, the resource allocation information of the neighboring cell that is sent by the first UE 1501, and allocates a resource to the first UE 1501 based on the resource allocation information.

Specifically, the first network device 1503 allocates the resource to the first UE 1501 with reference to the resource allocation information of the neighboring cell, so as to avoid a conflict with a resource of nearby UE connected to another network device, and avoid interference to the first network device 1503 in receiving uplink data of the first UE 1501, or avoid interference to another UE in the neighboring cell of the serving cell in which the first UE 1501 is located in receiving downlink data.

Optionally, the first network device 1503 may further send a request message through a first interface. The request message is used to request to obtain resource allocation information of the serving cell in which the first UE 1501 is located.

The second network device 1504 receives the request message; and sends, to the first network device 1503, the resource allocation information of the neighboring cell, among cells managed by the second network device 1504, of the serving cell in which the first UE 1501 is located.

Optionally, the second network device 1504 may broadcast, by using the first interface, resource allocation information of the cells managed by the second network device 1504. Then, after receiving, through the first interface, the resource allocation information of the cells managed by the second network device 1054, the first network device 1503 may determine, from the resource allocation information, the resource allocation information of the neighboring cell of the serving cell in which the first UE 1501 is located.

Further, a specific manner of obtaining, by the first UE 1501, the resource allocation information of the neighboring cell of the serving cell in which the first UE 1501 is located may be:

Manner 1:

The first UE 1501 sends a first request message through the first interface, where the first request message is used to request to obtain resource occupation information of UE in the neighboring cell of the serving cell in which the first UE 1501 is located. After receiving the first request message, the second UE 1502 sends the resource occupation information of the second UE 1502 to the first UE 1501 through the first interface. The first UE 1501 sorts the received resource occupation information based on different cells, to obtain the resource allocation information of the neighboring cell.

Manner 2:

The second UE 1502 broadcasts the resource occupation information of the second UE 1502 by using the first interface. Therefore, the first UE may receive the resource occupation information of the second UE 1502 through the first interface, and sorts the resource occupation information based on different cells, to obtain the resource allocation information of the neighboring cell.

Manner 3:

The first UE 1501 sends a second request message to the second network device 1504 through the first interface. The second request message is used to request to obtain the resource allocation information of the neighboring cell of the serving cell in which the first UE 1501 is located. After receiving the second request message, the second network device 1504 sends, to the first UE 1501 through the first interface, the resource allocation information of the neighboring cell, among the cells managed by the second network device 1504, of the serving cell in which the first UE 1501 is located.

Manner 4:

The second network device 1504 may broadcast, by using the first interface or a second interface, the resource allocation information of the cells managed by the second network device 1504. After receiving the resource allocation information of the cells that is broadcast by the second network device 1504, the first UE 1501 may determine, from the resource allocation information, the resource allocation information of the neighboring cell of the serving cell in which the first UE 1501 is located.

Further, the first network device 1503 and the second network device 1504 in the system may cooperatively provide a service for downlink data of the first UE 1501. Assuming that the network device connected to the second UE 1502 is the second network device 1504, a measurement result obtained after the first UE 1501 performs a reference signal sent by the second network device 1504 may be sent to the second UE 1502 through the first interface, and the second UE 1502 forwards the measurement result to the second network device 1504. Therefore, the second network device 1504 may adjust, based on the measurement result, transmit power for sending data to the first UE 1501, or adjust a resource used to send data to the first UE 1501, or when failing to send data to the first UE 1501, determine whether to perform retransmission, or the like.

According to the system, signaling overheads of an X2 interface can be reduced when the first network device 1503 and the second network device 1504 provide a downlink data service for the first UE 1501, and a communication delay between network devices can be further reduced when a system network is congested.

It can be learned that, in the system shown in FIG. 15, the first network device may receive, through a PC5 interface or a Uu interface, the resource allocation information, reported by the first UE, of the neighboring cell of the serving cell in which the first UE is located; or may receive, through a PC5 interface, the resource allocation information, sent by another network device, of the neighboring cell of the serving cell in which the first UE is located, so that the first network device may allocate the resource to the first UE based on the resource allocation information of the neighboring cell, so as to prevent the first UE from using a same resource as UE located in the neighboring cell, and reduce interference to the neighboring cell; or may allocate, to the first UE, a resource with relatively small interference to the UE, so as to reduce interference of the neighboring cell to the first UE. In this manner, signaling overheads of an X2 interface between network devices can be reduced, and efficiency for allocating a resource to UE can be further improved when a system network is relatively congested, so that a data transmission delay of UE can be reduced to some extent.

Currently, device-to-device (Device-to-Device, D2D) communication is mainly applied to a public safety (Public Safety, PS) service. A dedicated resource is allocated to the PS service to transmit D2D data, in other words, the D2D data is specifically communication data of the PS service. With development of an Internet of Vehicles technology, the D2D data has a more extensive meaning. To be specific, the D2D data not only includes the communication data of the PS service, but may also include communication data of a vehicle to everything (Vehicle to everything, V2X) service. In a current D2D data processing procedure, before data is sent, communication data of different service types cannot be distinguished. As a result, all data is carried on a same resource for transmission. In this case, a terminal device that requires only the communication data of the V2X service may receive communication data of a non-V2X service on the resource, and the terminal device needs to parse received data to obtain the required data. It can be learned that this manner increases power consumption at a receive end to some extent.

To resolve the foregoing problem, an embodiment of the present invention discloses still another resource allocation method. The method may be applied to the network architecture shown in FIG. 1, to be specific, a scenario in which two devices (UE and a network device, or two UEs) perform communication based on a first interface (such as a PC5 interface). The scenario may be specifically a D2D communication scenario.

Figure 16:
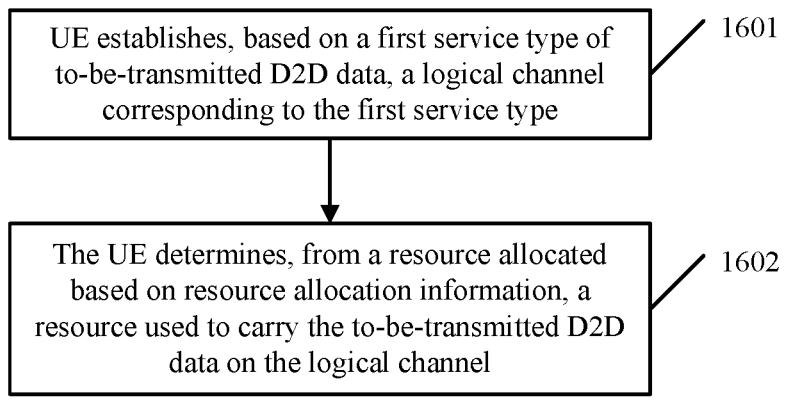
FIG. 16 is a schematic flowchart of still another resource allocation method according to an embodiment of the present invention.

FIG. 16 is a schematic flowchart of still another resource allocation method according to an embodiment of the present invention. As shown in FIG. 16, the method may include the following steps.

1601: UE establishes, based on a first service type of to-be-transmitted D2D data, a logical channel corresponding to the first service type.

In this embodiment of the present invention, the to-be-transmitted D2D data, namely, D2D communication data generated by the UE, is used by the UE to communicate with another UE or another terminal device by using a PC5 interface. The D2D data may be communication data of a PS service, or may be communication data of an Internet of Vehicles service, or may be communication data of a non-PS and non-Internet of Vehicles service. In other words, service types of D2D data may include the PS service and the Internet of Vehicles service, and may further include the non-PS and non-Internet of Vehicles service. The first service type includes the Internet of Vehicles service.

The Internet of Vehicles service may be a V2X service, and may specifically include vehicle to Infrastructure (Vehicle to Infrastructure, V2I), vehicle to vehicle (Vehicle to Vehicle, V2V), vehicle to pedestrian (Vehicle to Pedestrian, V2P), vehicle to network (Vehicle to Network, V2N), and the like. Then, after generating the to-be-transmitted D2D data and determining a service type of the to-be-transmitted D2D data (the service type of the to-be-transmitted D2D data is referred to as the first service type), the UE may establish, based on the first service type, the logical channel corresponding to the first service type.

It should be noted that the logical channel corresponding to the first service type may be understood as: establishing a dedicated logical channel for D2D data of the V2X service; or establishing a D2D logical channel, to be specific, establishing a logical channel by using a process of establishing a logical channel for D2D data of the PS service, where logical channels used to carry D2D data of the V2X service and logical channels used to carry the D2D data of the PS service need to be marked. Specifically, when establishing the logical channel for the to-be-transmitted D2D data, the UE may mark an identifier of the first service type on the logical channel.

For example, when the first service type of the to-be-transmitted D2D data is the PS service, the UE marks, as a logical channel for the PS service, the established logical channel that is corresponding to the first service type; or when the first service type of the to-be-transmitted D2D data is the V2X service, the UE marks, as a logical channel for the V2X service, the established logical channel that is corresponding to the first service type.

Specifically, on the UE side, indicating, by an application layer or a higher layer, a service type of generated D2D data to a data link layer (also referred to as a layer 2, Layer 2, L2) may be specifically: indicating, to a Packet Data Convergence Protocol (Packet Data Convergence Protocol, PDCP) sublayer, a Radio Link Control (Radio Link Control, RLC) sublayer, or a Media Access Control (Media Access Control, MAC) layer, the service type of the D2D data generated by the application layer or the higher layer. For example, if D2D data generated by the higher layer is data of the PS service, the higher layer indicates, to the MAC layer, that a service type of the D2D data is the PS service; or if D2D data generated by the higher layer is data of the V2X service, the higher layer indicates, to the MAC layer, that a service type of the D2D data is the V2X service.

1602: The UE determines, from a resource allocated based on resource allocation information, a resource used to carry the to-be-transmitted D2D data on the logical channel.

In this embodiment of the present invention, after establishing the logical channel used to carry the to-be-transmitted D2D data, the UE may determine, from the resource allocated based on the resource allocation information, the resource used for the to-be-transmitted D2D data on the logical channel. The resource allocated based on the resource allocation information may be a resource used to carry D2D data. The resource allocation information may include carrier information, for example, a carrier frequency, a service that may be performed at a carrier frequency, and information about a PRB (Physical Resource Block, PRB) used to carry D2D data. This is not limited in this embodiment of the present invention.

Specifically, the resource allocation information of the UE may further include a service type of data carried on the corresponding resource. Then the UE may select, based on the service type and from the resource carrying the D2D data, a resource used to carry D2D data of the first service type. In this way, the UE may send the to-be-transmitted D2D data on the resource.

Optionally, before determining, from the resource allocated based on the resource allocation information, the resource used to carry the to-be-transmitted D2D data on the logical channel, the UE may first obtain resource allocation information of the resource used to carry D2D data. The resource allocation information may include a data carrying manner of the resource used to carry D2D data.

A specific manner of determining, by the UE from the resource allocated based on the resource allocation information, the resource used to carry the to-be-transmitted D2D data on the logical channel may be:

determining, by the UE according to the data carrying manner and from the resource used to carry D2D data, the resource used to carry the to-be-transmitted D2D data on the logical channel.

It should be noted that there are two data carrying manners for the resource used to carry D2D data (also referred to as usages of the resource allocated based on the resource allocation information): an exclusive resource manner and a shared resource manner. The exclusive resource manner is: sending D2D data of different service types by using different resources. The shared resource manner is: sending D2D data of different service types by using a same resource. Then, after determining the data carrying manner of the resource used to carry D2D data, the UE may determine, according to the specific data carrying manner and from the resource allocated based on the resource allocation information, the resource used to carry the to-be-transmitted D2D data on the logical channel.

Specifically, when the data carrying manner is the exclusive resource manner, the resource allocation information may further include a second service type of D2D data carried on the resource used to carry D2D data. Then the UE may determine, as the resource used to carry the to-be-transmitted D2D data on the logical channel, a resource that is in the resource used to carry D2D data and that carries D2D data whose second service type is consistent with the first service type.

For another example, it is assumed that resource allocation information of a resource specifically includes: A carrier used to carry D2D data is F1, and F1 may be used to carry D2D data of the PS service and D2D data of the V2X service (namely, the shared resource manner). Then the UE maps the D2D data of the PS service and the D2D data of the V2X service to F1 to perform multiplexing and transmission. If carriers used to carry D2D data are F1 and F2, F1 is used to carry D2D data of the PS service, and F2 is used to carry D2D data of the V2X service, the UE maps the D2D data of the PS service to F1 to perform multiplexing and transmission, and maps the D2D data of the V2X service to F2 to perform multiplexing and transmission.

Optionally, a specific manner of obtaining, by the UE, the resource allocation information of the resource used to carry D2D data may be:

obtaining, by the UE from a preconfigured resource, the resource allocation information of the resource used to carry D2D data; or receiving, by the UE, the resource allocation information, sent by a network device, of the resource used to carry D2D data.

Specifically, the preconfigured resource may be understood as a resource allocated by a network device to the UE by using dedicated signaling or a broadcast message, or a resource stored in a memory or a subscriber identity module (Subscriber Identity Module, SIM) of the UE by the UE.

Specifically, a specific manner of receiving, by the UE, the resource allocation information, sent by the network device, of the resource used to carry D2D data may include: The UE directly receives resource allocation information that is used for D2D communication and that is indicated by the network device to the UE by using a broadcast message or dedicated signaling; or the UE first reports service type indication information to the network device, and after receiving the indication information, the network device then sends, to the UE, the resource allocation information of the resource used to carry D2D data.

The indication information is used to indicate a service type of data. To be specific, when the network device sends, to the UE, the resource allocation information of the resource used to carry D2D data, the resource allocation information may include the data carrying manner of the resource used to carry D2D data, and a service type of D2D data. The indication information may be carried in a resource request message. The resource request message includes sidelink UE information, a BSR, or the like.

It can be learned that, in the method shown in FIG. 16, the UE may mark a logical channel based on a service type of D2D data generated by the UE, and then may exclusively occupy a resource in a D2D data transmission process by distinguishing a data carrying manner of a resource allocated based on resource allocation information that comes from a network device or that is preconfigured by the UE. This can improve flexibility of resource utilization and can reduce power consumption for receiving data at a receive end.

Figure 17:
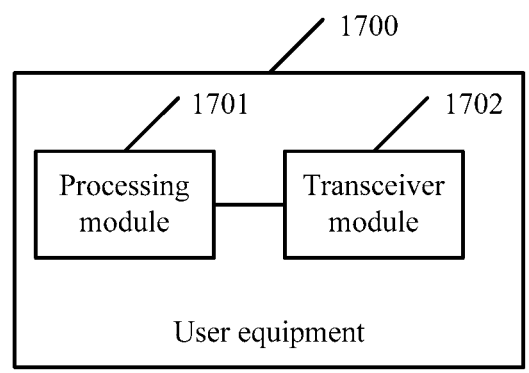
FIG. 17 is a schematic structural diagram of another user equipment according to an embodiment of the present invention.

FIG. 17 is a schematic structural diagram of still another user equipment according to an embodiment of the present invention. The UE 1700 shown in FIG. 17 may be applied to the method embodiment shown in FIG. 16. As shown in FIG. 17, the UE 1700 may include a processing module 1701 and a transceiver module 1702.

The processing module 1701 is configured to: establish, based on a first service type of to-be-transmitted D2D data, a logical channel corresponding to the first service type; and determine, from a resource allocated based on resource allocation information, a resource used to carry the to-be-transmitted D2D data on the logical channel.

The first service type includes an Internet of Vehicles service, and the Internet of Vehicles service may be a V2X service. The logical channel corresponding to the first service type may be understood as: establishing a dedicated logical channel for D2D data of the V2X service; or establishing a D2D logical channel, to be specific, establishing a logical channel by using a process of establishing a logical channel for D2D data of a PS service, where logical channels used to carry D2D data of the V2X service and logical channels used to carry the D2D data of the PS service need to be marked. Specifically, when establishing the logical channel for the to-be-transmitted D2D data, the processing module 1701 may mark an identifier of the first service type on the logical channel.

Specifically, the resource allocated based on the resource allocation information may be a resource used to carry D2D data. The resource allocation information may include carrier information, for example, a carrier frequency, a service that may be performed at a carrier frequency, and information about a PRB used to carry D2D data. This is not limited in this embodiment of the present invention. The resource allocation information of the UE 1700 may further include a service type of data carried on the corresponding resource. Then the processing module 1701 may select, based on the service type and from the resource carrying the D2D data, a resource used to carry D2D data of the first service type. In this way, the UE 1700 may send the to-be-transmitted D2D data on the resource.

Optionally, before the processing module 1701 determines, from the resource allocated based on the resource allocation information, the resource used to carry the to-be-transmitted D2D data on the logical channel, the transceiver module 1702 may first obtain resource allocation information of the resource used to carry D2D data. The resource allocation information may include a data carrying manner of the resource used to carry D2D data.

A specific manner of determining, by the processing module 1701 from the resource allocated based on the resource allocation information, the resource used to carry the to-be-transmitted D2D data on the logical channel may be:

determining, according to the data carrying manner and from the resource used to carry D2D data, the resource used to carry the to-be-transmitted D2D data on the logical channel.

It should be noted that there are two data carrying manners for the resource used to carry D2D data (also referred to as usages of the resource allocated based on the resource allocation information): an exclusive resource manner and a shared resource manner. The exclusive resource manner is: sending D2D data of different service types by using different resources. The shared resource manner is: sending D2D data of different service types by using a same resource. Then, after determining the data carrying manner of the resource used to carry D2D data, the processing module 1701 may determine, according to the specific data carrying manner and from the resource allocated based on the resource allocation information, the resource used to carry the to-be-transmitted D2D data on the logical channel.

Optionally, when the data carrying manner is the exclusive resource manner, the resource allocation information may further include a second service type of D2D data carried on the resource used to carry D2D data. Then the processing module 1701 may determine, as the resource used to carry the to-be-transmitted D2D data on the logical channel, a resource that is in the resource used to carry D2D data and that carries D2D data whose second service type is consistent with the first service type.

Optionally, a specific manner of obtaining, by the transceiver module 1702, the resource allocation information of the resource used to carry D2D data may be:

obtaining, from a preconfigured resource, the resource allocation information of the resource used to carry D2D data; or receiving the resource allocation information, sent by a network device, of the resource used to carry D2D data.

Figure 18:
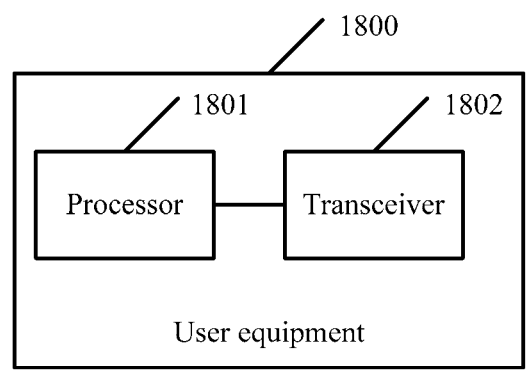
FIG. 18 is a schematic structural diagram of another user equipment according to an embodiment of the present invention.

FIG. 18 is a schematic structural diagram of still another user equipment according to an embodiment of the present invention. The UE 1800 shown in FIG. 18 may be applied to the method embodiment shown in FIG. 16. As shown in FIG. 18, the UE 1800 may include a processor 1801 and a transceiver 1802.

The processor 1801 is configured to: establish, based on a first service type of to-be-transmitted D2D data, a logical channel corresponding to the first service type; and determine, from a resource allocated based on resource allocation information, a resource used to carry the to-be-transmitted D2D data on the logical channel.

The first service type includes an Internet of Vehicles service, and the Internet of Vehicles service may be a V2X service. The logical channel corresponding to the first service type may be understood as: establishing a dedicated logical channel for D2D data of the V2X service; or establishing a D2D logical channel, to be specific, establishing a logical channel by using a process of establishing a logical channel for D2D data of a PS service, where logical channels used to carry D2D data of the V2X service and logical channels used to carry the D2D data of the PS service need to be marked. Specifically, when establishing the logical channel for the to-be-transmitted D2D data, the processor 1801 may mark an identifier of the first service type on the logical channel.

Specifically, the resource allocated based on the resource allocation information may be a resource used to carry D2D data. The resource allocation information may include carrier information, for example, a carrier frequency, a service that may be performed at a carrier frequency, and information about a PRB used to carry D2D data. This is not limited in this embodiment of the present invention. The resource allocation information of the UE 1800 may further include a service type of data carried on the corresponding resource. Then the processor 1801 may select, based on the service type and from the resource carrying the D2D data, a resource used to carry D2D data of the first service type. In this way, the UE 1800 may send the to-be-transmitted D2D data on the resource.

Optionally, before the processor 1801 determines, from the resource allocated based on the resource allocation information, the resource used to carry the to-be-transmitted D2D data on the logical channel, the transceiver 1802 may first obtain resource allocation information of the resource used to carry D2D data. The resource allocation information may include a data carrying manner of the resource used to carry D2D data.

A specific manner of determining, by the processor 1801 from the resource allocated based on the resource allocation information, the resource used to carry the to-be-transmitted D2D data on the logical channel may be:

determining, according to the data carrying manner and from the resource used to carry D2D data, the resource used to carry the to-be-transmitted D2D data on the logical channel.

It should be noted that there are two data carrying manners for the resource used to carry D2D data (also referred to as usages of the resource allocated based on the resource allocation information): an exclusive resource manner and a shared resource manner. The exclusive resource manner is: sending D2D data of different service types by using different resources. The shared resource manner is: sending D2D data of different service types by using a same resource. Then, after determining the data carrying manner of the resource used to carry D2D data, the processor 1801 may determine, according to the specific data carrying manner and from the resource allocated based on the resource allocation information, the resource used to carry the to-be-transmitted D2D data on the logical channel.

Optionally, when the data carrying manner is the exclusive resource manner, the resource allocation information may further include a second service type of D2D data carried on the resource used to carry D2D data. Then the processor 1801 may determine, as the resource used to carry the to-be-transmitted D2D data on the logical channel, a resource that is in the resource used to carry D2D data and that carries D2D data whose second service type is consistent with the first service type.

Optionally, a specific manner of obtaining, by the transceiver 1802, the resource allocation information of the resource used to carry D2D data may be:

obtaining, from a preconfigured resource, the resource allocation information of the resource used to carry D2D data; or receiving the resource allocation information, sent by a network device, of the resource used to carry D2D data.

It can be learned that, according to the UE shown in FIG. 17 or FIG. 18, the UE may mark a logical channel based on a service type of D2D data generated by the UE, and then may exclusively occupy a resource in a D2D data transmission process by distinguishing a data carrying manner of a resource allocated based on resource allocation information that comes from a network device or that is preconfigured by the UE. This can improve flexibility of resource utilization and can reduce power consumption for receiving data at a receive end.

It should be noted that, in the foregoing embodiments, the description of each embodiment has respective focuses. For a part that is not described in detail in an embodiment, reference may be made to related descriptions in other embodiments. In addition, persons skilled in the art should also know that all the embodiments described in the specification are example embodiments, and the related actions and modules are not necessarily mandatory to the present invention.

A sequence of the steps of the method in the embodiments of the present invention may be adjusted, and specific steps may also be combined or removed according to an actual requirement.

The modules in the network device and the user equipment in the embodiments of the present invention may be combined, divided, or deleted according to an actual requirement.

The network device and the user equipment in the embodiments of the present invention may be implemented by a general-purpose integrated circuit such as a CPU (Central Processing Unit, central processing unit), or an ASIC (Application-Specific Integrated Circuit, application-specific integrated circuit).

Persons of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be a magnetic disc, an optical disc, a read-only memory (Read-Only Memory, ROM), a random access memory (Random Access Memory, RAM), or the like.

The resource allocation method and the related device disclosed in the embodiments of the present invention are described in detail above. The principle and implementations of the present invention are described in this specification by using specific examples. The descriptions of the embodiments of the present invention are merely provided to help understand the method and core ideas of the present invention. In addition, persons of ordinary skill in the art may make variations and modifications to the specific implementations and the application scope according to the ideas of the present invention. Therefore, the content of this specification shall not be construed as a limitation on the present invention.

What is claimed is:

1. A network device, wherein the network device comprises:

a transceiver, configured to receive, through an interface, resource allocation information of a neighboring cell of a serving cell in which first UE is located, wherein a network device to which the neighboring cell belongs is different from the network device, the interface comprises a first interface or a second interface, the first interface is an interface that performs communication by using a UE-to-UE communications technology, and the second interface is an interface that performs communication by using a UE-to-network device communications technology; and a processor, configured to allocate a resource to the first UE based on the resource allocation information of the neighboring cell; and, wherein receiving, by the transceiver through the interface, the resource allocation information of the neighboring cell of the serving cell in which the first UE is located comprises:

receiving, through the first interface, resource allocation information, sent by a second network device, of each cell managed by the second network device; and triggering the processor to determine, from the resource allocation information of each cell, the resource allocation information of the neighboring cell of the serving cell in which the first UE is located.

2. The network device according to claim 1, wherein the first interface is a PC5 interface, an interface between devices connected through Wi-Fi, or an interface between devices paired through Bluetooth, and the second interface is a Uu interface.

3. The network device according to claim 1, wherein
the transceiver is further configured to: before receiving, through the interface, the resource allocation information of the neighboring cell of the serving cell in which the first UE is located, receive, through the interface, a measurement result reported by the first UE, wherein the measurement result is a measurement result obtained after the first UE performs signal measurement on a reference signal sent by the network device.

4. The network device according to claim 1, wherein a specific manner of receiving, by the transceiver through the interface, the resource allocation information of the neighboring cell of the serving cell in which the first UE is located is:

sending a request message through the first interface, wherein the request message is used to request to obtain the resource allocation information of the neighboring cell of the serving cell in which the first UE is located; and receiving, through the first interface, the resource allocation information of the neighboring cell that is sent by a second network device according to the request message, wherein the second network device is the network device to which the neighboring cell belongs.

5. The network device according to claim 1, wherein a specific manner of receiving, by the transceiver through the interface, the resource allocation information of the neighboring cell of the serving cell in which the first UE is located is:

receiving, through the interface, the resource allocation information, reported by the first UE, of the neighboring cell of the serving cell in which the first UE is located.

6. UE, wherein the UE comprises:
a transceiver, configured to receive resource allocation information of a neighboring cell of a serving cell in which the UE is located, wherein a network device to which the neighboring cell belongs is different from a first network device connected to the UE; and the transceiver is further configured to report the resource allocation information of the neighboring cell to the first network device by using an interface, wherein the resource allocation information of the neighboring cell is used by the first network device to allocate a resource to the UE, the interface comprises a first interface or a second interface, the first interface is an interface that performs communication by using a UE-to-UE communications technology, and the second interface is an interface that performs communication by using a UE-to-network device communications technology; and, wherein the UE further comprises:

a processor, configured to: perform signal measurement on a reference signal sent by the first network device, to obtain a first measurement result and if the first measurement result is less than a first threshold, trigger the transceiver to perform the operation of reporting the resource allocation information of the neighboring cell to the first network device by using an interface.

7. The UE according to claim 6, wherein the first interface is a PC5 interface, an interface between devices connected through Wi-Fi, or an interface between devices paired through Bluetooth, and the second interface is a Uu interface.

8. The UE according to claim 6, wherein a specific manner of receiving, by the transceiver through the interface, the resource allocation information of the neighboring cell of the serving cell in which the UE is located is:

receiving, through the first interface, resource occupation information that is sent by at least one second UE and that is of the second UE, wherein the resource occupation information is information about a resource allocated to the second UE by a network device connected to the second UE, the resource occupation information carries a cell identity of a serving cell in which the second UE is located, the serving cell in which the second UE is located is the neighboring cell of the serving cell in which the first UE is located, and the network device connected to the second UE is different from the first network device; and triggering the processor to determine, based on the cell identity, resource occupation information carrying a same cell identity from the resource occupation information that is sent by the at least one second UE and that is of the second UE, and determine, based on the resource occupation information carrying the same cell identity, resource allocation information of a cell marked by the same cell identity.

9. The UE according to claim 8, wherein
the transceiver is further configured to: before receiving, through the first interface, the resource occupation information that is sent by the at least one second UE and that is of the second UE, send a first request message through the first interface, wherein the first request message is used to request to obtain resource occupation information of UE in the neighboring cell of the serving cell in which the UE is located.

10. The UE according to claim 6, wherein a specific manner of receiving, by the transceiver through the interface, the resource allocation information of the neighboring cell of the serving cell in which the UE is located is:

sending a second request message to a second network device through the first interface, wherein the second network device is the network device to which the neighboring cell of the serving cell in which the UE is located belongs, and the second request message is used to request to obtain the resource allocation information of the neighboring cell; and receiving, through the first interface, the resource allocation information of the neighboring cell that is sent by the second network device according to the second request message.

11. The UE according to claim 6, wherein a specific manner of receiving, by the transceiver through the interface, the resource allocation information of the neighboring cell of the serving cell in which the UE is located is:

receiving, through the interface, resource allocation information, sent by a second network device, of each cell managed by the second network device; and triggering the processor to determine, from the resource allocation information of each cell, the resource allocation information of the neighboring cell of the serving cell in which the UE is located, wherein the second network device is the network device to which the neighboring cell belongs.

12. The UE according to claim 8, wherein a specific manner of determining, by the processor based on the cell identity, the resource occupation information carrying the same cell identity from the resource occupation information that is sent by the at least one second UE and that is of the second UE is:

if the resource occupation information further carries a second measurement result, determining, based on the cell identity, the resource occupation information carrying the same cell identity from the resource occupation information that is sent by the at least one second UE and that is of the second UE and whose second measurement result is less than a second threshold, wherein the second measurement result is a measurement result obtained after the second UE performs signal measurement on a reference signal sent by the network device connected to the second UE; or performing signal measurement on a reference signal sent by the second UE, to obtain a third measurement result, and determining, based on the cell identity, the resource occupation information carrying the same cell identity from the resource occupation information that is sent by the at least one second UE and that is of the second UE and whose third measurement result is greater than a third threshold.

13. UE, wherein the UE comprises:

a transceiver, configured to receive, through an interface, a request message sent by first UE, wherein the request message is used to request to obtain resource occupation information of UE in a neighboring cell of a serving cell in which the first UE is located, and the interface is an interface that performs communication by using a UE-to-UE communications technology; and a processor, configured to determine that a serving cell in which the UE is located is the neighboring cell of the serving cell in which the first UE is located, and a network device connected to the UE is different from a network device connected to the first UE, wherein the transceiver is configured to send the resource occupation information of the UE to the first UE through the interface.

14. The UE according to claim 13, wherein the interface is a PC5 interface, an interface between devices connected through Wi-Fi, or an interface between devices paired through Bluetooth.

15. The UE according to claim 13, wherein the processor is further configured to: perform signal measurement on a reference signal sent by the network device connected to the UE, to obtain a first measurement result; and if the first measurement result is less than a first threshold, trigger the transceiver to perform the operation of sending the resource occupation information of the UE to the first UE through the interface.

16. The UE according to any one of claim 13, wherein a specific manner of sending, by the transceiver, the resource occupation information of the UE to the first UE through the interface is:

if the request message further comprises a second measurement result obtained after the first UE performs signal measurement on a reference signal sent by the first network device, and the second measurement result is less than a second threshold, sending the resource occupation information of the UE to the first UE through the interface.

* * * * *